US007197443B2

(12) United States Patent
Manrique

(10) Patent No.: US 7,197,443 B2
(45) Date of Patent: Mar. 27, 2007

(54) WAVEGUIDE MODELING AND DESIGN SYSTEM

(75) Inventor: Pedro Manrique, Pasadena, CA (US)

(73) Assignee: Harman International Industries, Incorporated, Northridge, CA (US)

( * ) Notice: Subject to any disclaimer, the term of this patent is extended or adjusted under 35 U.S.C. 154(b) by 603 days.

(21) Appl. No.: 10/697,662

(22) Filed: Oct. 29, 2003

(65) Prior Publication Data

US 2005/0094836 A1 May 5, 2005

(51) Int. Cl.
*G06F 17/10* (2006.01)
*H04R 1/02* (2006.01)

(52) U.S. Cl. .............................. 703/2; 703/1; 381/340

(58) Field of Classification Search .................... 703/2, 703/1; 381/337, 340, 342; 385/11, 15, 50
See application file for complete search history.

(56) References Cited

U.S. PATENT DOCUMENTS 5,912,997 A * 6/1999 Bischel et al. ................ 385/15
5,917,974 A * 6/1999 Tavlykaev et al. ............ 385/50
6,151,429 A * 11/2000 Kristensen et al. ........... 385/11

OTHER PUBLICATIONS

Coldren et al., L.A. Thin Film Waveguides of Arbitrary Cross Section, IEEE Transactions on Sonics and Ultrasonics, vol. su-22, No. 2, Mar. 1975, pp. 123-130.*

Oliner, A.A. Acoustic Surface Waveguides and Comparisons with Optical Waveguides, IEEE Transactions on Microwave Theory and Techniques, vol. mmt-24, No. 12, Dec. 1976, pp. 914-920.*

Rocchesso et al., D. Generalized Digital Waveguide Networks, IEEE Transactions on Speech and Audio Processing, vol. 11, No. 3, May 2003, pp. 242-254.*

Kausel, W. Bore Reconstruction of Tubular Ducts from its Acoustic Input Impedance Curve, IEEE Instrumentation and Measurement Technology Conference, May 2003, pp. 993-998.*

(Continued)

*Primary Examiner*—Russell Frejd
(74) *Attorney, Agent, or Firm*—The Eclipse Group LLP

(57) ABSTRACT

This invention provides a method for designing a waveguide profile based upon predicted performance measurements of the waveguide. The method involves establishing a design metric, such as the change in acoustic reactance along the transition of the waveguide. Initial values may then assigned for the radius or diameter of the throat of the waveguide as well as values for the initial slope of the waveguide along the major and minor (or x and y) axis and the depth of the waveguide. The waveguide may then be divided into two or more sections. The values of the slopes for each section are then altered based upon the design metric. When using the change of acoustic reactance as the design metric, the slope of each section of the waveguide is adjusted to minimize the change in acoustic reactance between the sections, which is the desired performance standard. Once the slopes of each section are adjusted to achieve minimal change in acoustic reactance, the sections are concatenated together and the curve is smoothed using a polynomial function order curve fit to create a waveguide profile. This profile correlates with the design measurements, which allows for the prediction of the performance standards and/or dispersion characteristics of the waveguide. This allows for design iterations to be made to the waveguide to adjust for performance measurements without building a prototype.

72 Claims, 20 Drawing Sheets

OTHER PUBLICATIONS

Warren et al., D.P. Acoustic scattering in waveguides that are discontinuous in geometry and material property, Wave Motion, vol. 36, No. 2, Aug. 2002, pp. 119-142.*

Bangtsson et al., E. Shape optimization of an acoustic horn, Computer Methods in Applied Mechanics and Engineering, vol. 192, Mar. 2003, pp. 1533-1571.*

Aberg, M. Numerical modeling of acoustic emission in laminated tensile test specimans, International Journal of Solids and Structures, vol. 38, Sep. 2001, pp. 6643-6663.*

Schuhmacher et al., A. Modelling of horn-type loudspeakers for outdoor sound reinforcement systems, Applied Acoustics, vol. 56, Jan. 1999, pp. 25-37.*

* cited by examiner

WAVEGUIDE MODELING AND DESIGN SYSTEM

BACKGROUND OF THE INVENTION

1. Field of the Invention

This invention generally relates to acoustic waveguides and in particular to a method and system for modeling the design of an acoustic waveguide based upon predicted performance standards and performance metrics for a waveguide having certain physical characteristics and dimensions.

2. Related Art

Often times, loudspeakers consist of a transducer or driver unit coupled to a waveguide. A waveguide can also be commonly referred to as a horn or acoustic waveguide. A waveguide functions to provide gain for the transducer, i.e., increases the acoustic sensitivity of the loudspeaker in a region of frequencies. A waveguide can also assist in the control of dispersion on and off-axis as well as assist with directivity mating with other transducers and can simplify loudspeaker system integration.

Typical waveguides include a "throat" or entrance at one end and a "mouth" or exit at the opposing end. The throat end of the waveguide is typically coupled to the transducer or driver and receives the initial input of sound from the driver. The waveguide then usually increases in cross-sectional area or flares out as it approaches the mouth. The sound is then dispersed through the mouth, which is the exit of the waveguide. Thus, the throat end of the waveguide is typically narrower in cross-section in both the horizontal and vertical directions and generally defines a bounded region that directs the sound from the throat to the mouth of the waveguide. This interior bounded region may be referred to as the waveguide profile. The sound produced as planar surfaces parallel to the throat, are referred to as wave fronts.

In operation, the surfaces of the waveguide in a loudspeaker typically produce a coverage pattern of a specified total coverage angle that may differ horizontally and vertically. The coverage angle is a total angle in any plane of observations, although horizontal and vertical orthogonal planes are typically used. The coverage angle is evaluated as a function of frequency and is defined to be the angle at which the intensity of sound (Sound Pressure Level—SPL) is half of the SPL on the reference axis, which is the axis direction usually normal to the throat of the driver.

Acoustic energy radiates into the throat from the transducer at high pressure, with a wave front that is nominally flat and free of curvature. As the wave front expands outward to toward the mouth of the waveguide, the axial area increases in a uniform and monotonically increasing fashion. Analogous to electrical transformers in the electrical domain, waveguides can be considered as acoustical transformers in the acoustical domain. In the acoustical domain, waveguides contain impedance along the profile with resistive and reactive components. However, sound pressure level is produced primarily by the acoustical resistance of the waveguide. That is, acoustical reactance does not contribute to the sound pressure level. In the work presented, the rate of increasing area is controlled by an area expansion function designed to provide minimal acoustic reactance (or maximum acoustic radiation resistance at the throat). This approach increases the sensitivity and ultimately, the efficiency of the transducer and waveguide assembly.

The determined area expansion rate is intended to create a uniform dispersion pattern on and off-axis by manipulating the acoustical impedance as a function of frequency to theoretically lower frequency range of operation. The coupling of the waveguide acoustic impedance source to the acoustic impedance of the surrounding environment; provides an action analogous to an electrical transformer. The winding ratio is equivalent to the ratio of the radiation resistance seen by the driver and the radiation resistance of the surrounding environment. In this analogy, the change in pressure from the throat to the mouth of the waveguide is equivalent to the change in voltage across an electrical transformer.

The shape of an acoustic waveguide affects the frequency response, polar pattern and the level of harmonic distortion of sound waves as they propagate away from the acoustic waveguide. As loudspeakers produce sound waves, waveguides are used to control the characteristics of the acoustic wave propagation. As previously stated, the increase in area of the waveguide from throat to mouth is typically controlled by an area expansion function designed to provide appropriate acoustic impedance. Many different theories on waveguide design have been developed in the past to help determine the optimal expansion functions for waveguide designs.

One common design approach, developed by Keele, involves a two-section waveguide or horn design. In this design approach, an exponential design is used on the section near the throat, while the outer section utilizes a conical design approach. Similarly, Geddes developed an alternative design approach that is a well known in the industry. This approach uses exponential algebraic equations and functions developed by Geddes to determine the optimal contour of a waveguide once required values for the throat radius and coverage angle have been determined.

Current design approaches, such as those taught by Keele and Geddes, first determine the desired performance standards of the waveguide and then design the waveguide using established exponential functions or algebraic equations that are designed to model a waveguide to achieve the desired standards. No design method currently exists, however, that uses the performance standards of a waveguide of known contours and dimensions as a design metric. Additionally, no design method currently exists that captures the change in acoustic impedance, in particular the change in acoustic reactance, along the profile of the waveguide as part of the design standard. A need therefore exists for a waveguide design method such that one can predict the performance standards of waveguides having various contours and dimensions without the necessity of building a prototype. Under this proposed approach, design iterations can be made before the prototype stage of the waveguide since the performance standards may be predicted in advance of the design.

SUMMARY

This invention provides a method of designing waveguides capable of sustaining a generally constant change in impedance and pressure gradient along the transition of the waveguide from throat to mouth by using design metrics known to correlate with the physical dimensions, contours, and acoustical measurements of waveguides. The design methodology captures the change in acoustical impedance within the area expansion function and explicitly determines the waveguide profile required by providing a predicted frequency response, without the use of a discrete prototype.

With an established set of design metrics, waveguide profiles can be design by dividing the waveguide profile into two or more different exponential profiles having two or more different slopes. The slopes are then altered by applying functions derived from the set of design metrics. Once altered, the resulting waveguide profiles from the different slopes are then concatenated together and smoothed to produce a design key for prototyping a waveguide that can achieve the desired design performance specifications; for which the design metric is based.

In one embodiment, the design metric is the change in acoustic reactance along the profile of the waveguide. The waveguide is divided into ten sections. Initial values are then assigned for the radius or diameter of the throat of the waveguide as well as values for the initial slope of the waveguide along the major and minor (or x and y) axis, polynomial smoothing order for the ten concatenated profiles, and the desired depth of the waveguide. The values for the slopes of each section are then altered based upon functions derived from the design metrics. In this example implementation, each slope is adjusted to minimize the change in acoustic reactance along the waveguide profile, which is the desired performance standard. Once the slopes of each section are adjusted to achieve minimal change in acoustic reactance, the sections are concatenated together and the curve is smoothed using a polynomial function order curve fit to create a continuous waveguide profile. The profile correlates with the design measurements, which allows for the prediction of the performance standards or dispersion characteristics of the waveguide. Design iterations may then be made to adjust for desired performance measurements without the necessity of building a prototype.

Furthermore, since the uniform acoustical reactance along the waveguide profile provides stable and predictable dispersion on-axis and off axis, the invention may be used to design waveguides having elliptical cross-sectional areas that produce circular dispersion patterns (i.e. an elliptical waveguide that produces the same horizontal and vertical dispersion patterns from 1 kHz to 10 kHz). Conversely, the design allows for the design of waveguides having circular cross-sectional areas yet provide elliptical dispersion patterns (i.e. a circular waveguide that produces different horizontal and vertical dispersion patterns from 1 kHz to 10 kHz).

Other systems, methods, features and advantages of the invention will be or will become apparent to one with skill in the art upon examination of the following figures and detailed description. For example, this design method could be used to design transducers diaphragms found in tweeters, mid-ranges, mid-bass, woofers, and subwoofers commonly used in loudspeaker systems. Similarly, this work could be used to design waveguides that are found in radar and communication applications using analogous partitions, concatenations, and design metrics. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
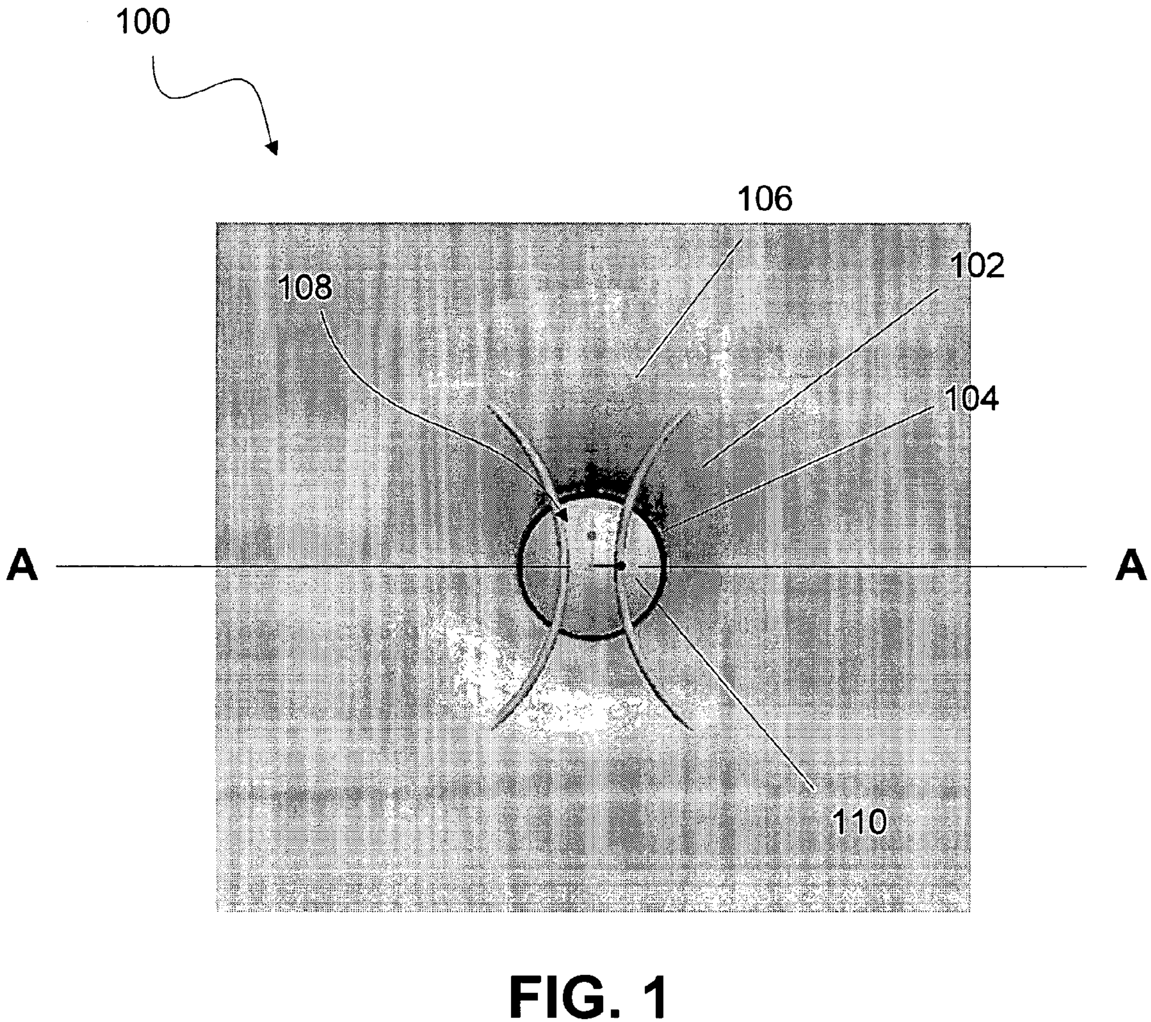
FIG. 1 is a front view of a loudspeaker utilizing an acoustic waveguide designed in accordance with the design method of the invention.

FIG. 1 illustrates a perspective view of a loudspeaker 100 utilizing an acoustic waveguide 102 designed according to the design method of the invention. As illustrated in FIG. 1, the loudspeaker system 100 has an acoustic waveguide 102 defined by a continuous three-dimensional surface. Defined at one end of the waveguide 102 is a throat 104 and at the opposing end, a mouth 106. Coupled to the throat 104 of the waveguide 100 is a transducer or driver 108. While FIG. 1, illustrates the loudspeaker driver 108 having a dome 110 diaphragm, loudspeakers using diaphragms of other shapes may also be used in connection with the invention. Further, the loudspeaker 100 in FIG. 1, illustrates the waveguide 102 used in connection with a tweeter (generally 2 kHz–20 kHz); however, the waveguide 102 of the invention may be used in connection with specialized drivers for other dedicated parts of the audio frequency band, such as ultra-high frequency drivers (generally 10 kHz–40 kHz), midrange drivers (generally 200 Hz–5 kHz), and woofers (generally 20 Hz–1 kHz).

Figure 2:
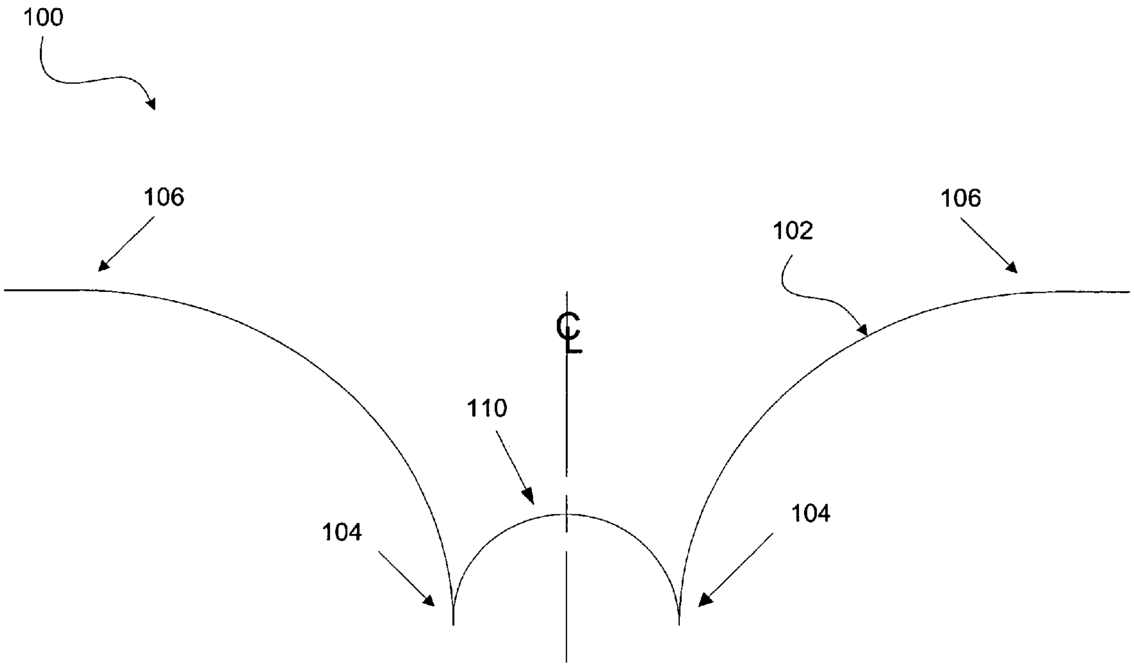
FIG. 2 is a cross-sectional view of the acoustic waveguide and dome diaphragm of the loudspeaker of FIG. 1 taken along line A—A.

FIG. 2 illustrates a cross-sectional view of the waveguide 102 and dome diaphragm 110 of the loudspeaker 100 of FIG. 1, taken along line A—A. As illustrated in FIG. 2, the throat 104 of the waveguide 102 is coupled to the diaphragm 110 of the driver. The waveguide 102 then flares outward from the throat 104 to the free end of the mouth 106 at an exponential flare rate m.

Figure 3:
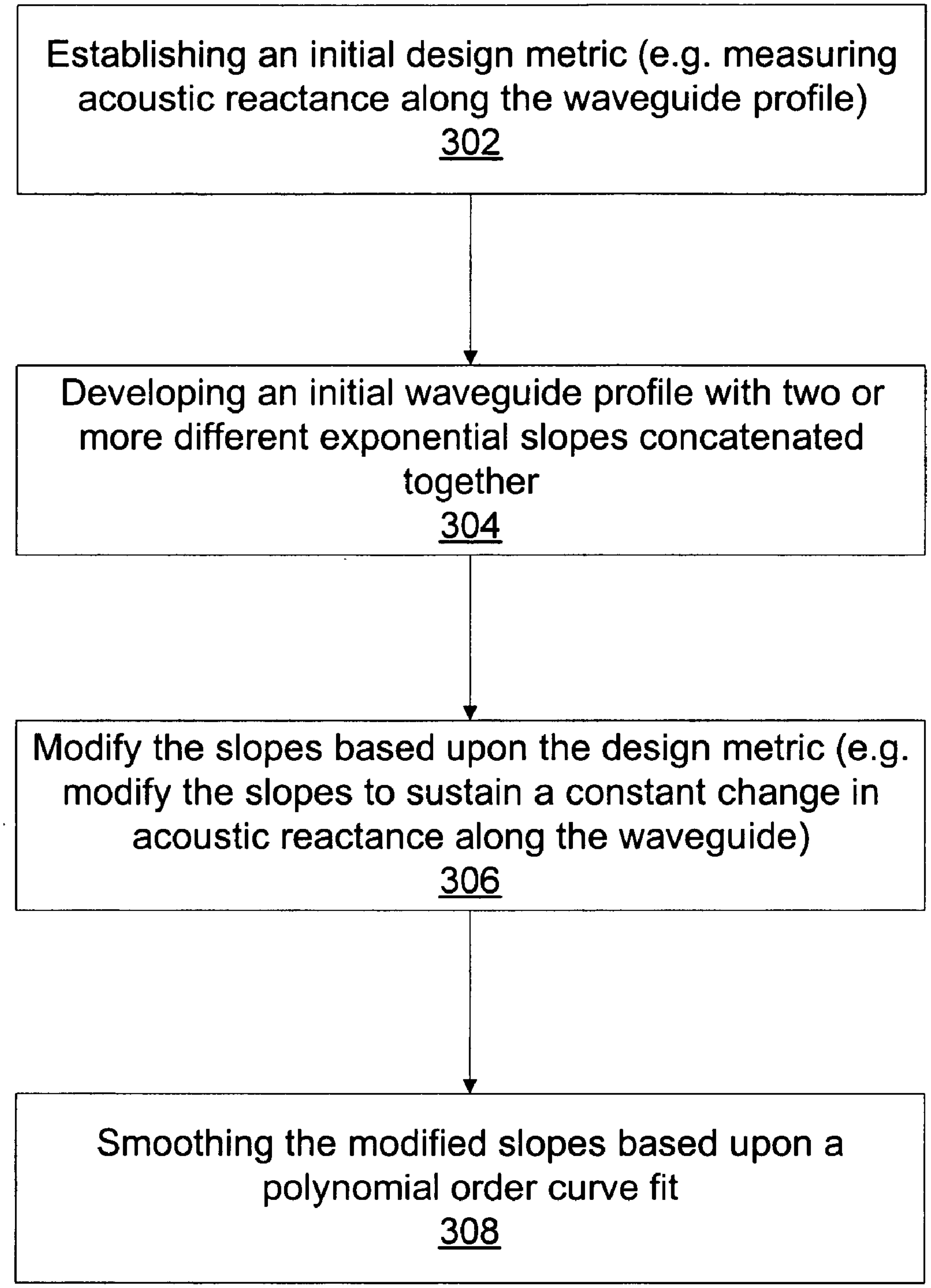
FIG. 3 is a flow diagram of an example implementation of the waveguide design methodology of the invention.

FIG. 3 illustrates a flow diagram of an example implementation 300 of waveguide design methodology of the invention. As illustrated in FIG. 3, the initial step 302 of the invention involves establishing a set of performance metrics under which the waveguide is to be designed. In the described example implementation, the design metric under which the waveguide will be measured and designed is the minimum change in acoustic reactance. Although the design metric basis described in this example implementation is based upon the change in acoustic reactance, one skilled in the art will recognize that other design metrics, such as change in acoustic resistance, may be used in connection with the principles and theory of the invention to achieve substantially similar waveguide design profiles.

Once the design metrics are established, an exponential waveguide profile with two or more different exponential slopes are then concatenated together 304. This is accomplished by first altering the slopes 306 of each section using the design metric. In this example implementation, the slopes are altered to sustain a constant change in acoustic reactance along the transitions section of the waveguide, from the throat to the mouth of the waveguide. Once the slopes 306 of each section are altered, the sections are then concatenated together using exponential functions based upon the desired depth and initial design radius of the given waveguide. Once the sections are concatenated together, the profile of concatenated exponential contours having modified slopes is then smoothed 308 based upon a polynomial order curve fit, producing a design key for ease in prototyping the waveguide. Steps 302–306 shall each be explained in further detail below.

Figure 4:
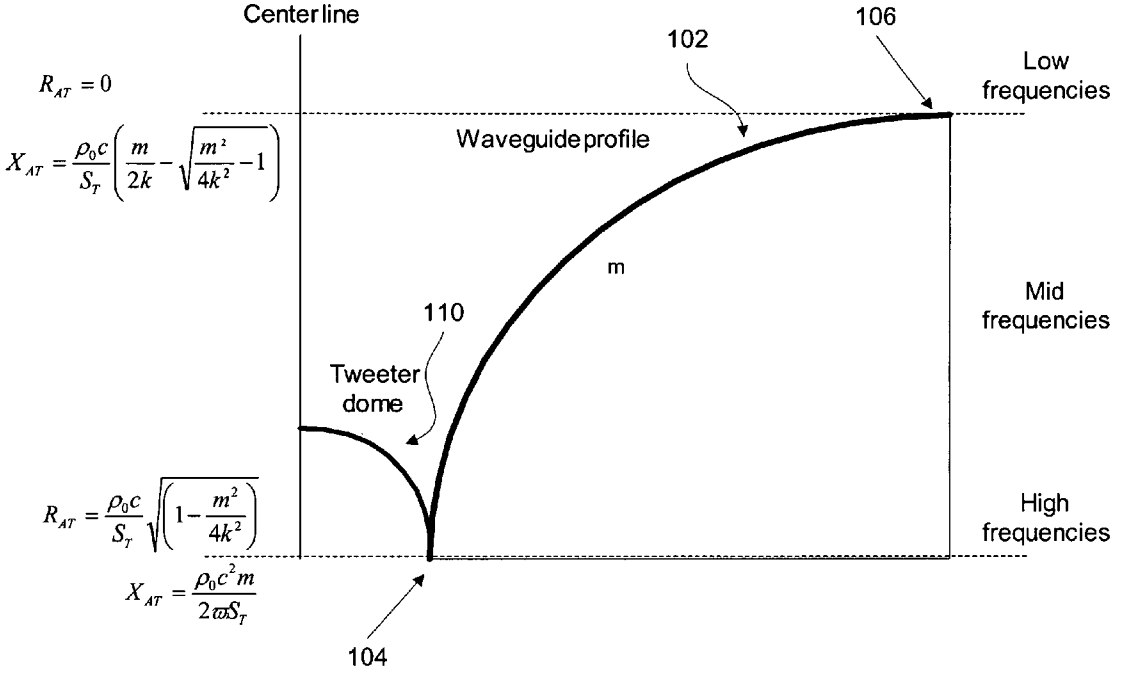
FIG. 4 illustrates the transition in theoretical component of the acoustic impedance along the transition of a waveguide from throat to mouth.

FIG. 4 illustrates the transition in theoretical acoustic impedance along the wave front of a waveguide. As discussed in the background section, it is highly desirable to design a waveguide that can sustain a constant change in acoustic reactance or impedance along the transition of the waveguide from the throat to the mouth of the waveguide. Several know equations may be used to measure the change in acoustic reactance across a given waveguide and may be used as the design metric for the basis of the invention.

To understand the equations defining acoustic impedance, it is first helpful to recognize several known theories associated with waveguides that may be considered to form the basis of the design metrics. The first equation of interest is:

$$S=S_T e^{mx}$$

where $S_T$ is the area at the throat, m is the flare rate along the length defined as x, and S is the area at the mouth of the waveguide. Further, steady state pressure is defined as:

$$P(t) = P_+ e^{-mx} e^{-j\frac{x}{2}\left(\sqrt{4k^2-m^2}\right)} e^{-j\omega t}$$

$$\text{where } k = \frac{2\pi}{\lambda} = \frac{\varpi}{c} = \frac{2\pi f}{c}$$

As for calculating or measuring the change in acoustic impedance across the waveguide from throat to mouth, it is known by those skilled in the art that acoustic impedance is defined as unique components for low and high frequencies. For example, when the flare rate m is greater than 4π divided by the wavelength (m>2k, low frequencies), the acoustic impedance is defined as:

$$R_{AT} = 0$$

$$X_{AT} = \frac{\rho_0 c}{S_T}\left(\frac{m}{2k} - \sqrt{\frac{m^2}{4k^2} - 1}\right) \text{ and}$$

$\rho_o c$=406 *mks* ohms at 20° C. and $10^5$ newtons/$m^2$ ambient temperature Similarly, when the flare rate m equals 4π divided by the wavelength ($m=4\pi f_c/c$ where $f_c$ is the cutoff frequency) the acoustic impedance is defined as:

$$R_{AT} = 0$$

$$X_{AT} = \frac{\rho_0 c}{S_T}$$

At this frequency, the acoustical impedance at all positions along the waveguide is reactive. As a result, no acoustical power will be transmitted below this frequency.

Lastly, when the flare rate m is less than 4π divided by the wavelength, (m<2k, high frequencies), the acoustic impedance is defined as:

$$R_{AT} = \frac{\rho_0 c}{S_T}\sqrt{\left(1 - \frac{m^2}{4k^2}\right)}$$

$$X_{AT} = \frac{\rho_0 c^2 m}{2\varpi S_T}$$

As illustrated by FIG. 4, the acoustic impedance equation for high frequencies is generally applied near the throat 106 of the waveguide 102, where the waveguide interfaces with the diaphragm 110 of the driver. In contrast, the acoustic impedance equation for low frequencies is applied near the mouth 108 or open end of the waveguide 102.

Figure 5:
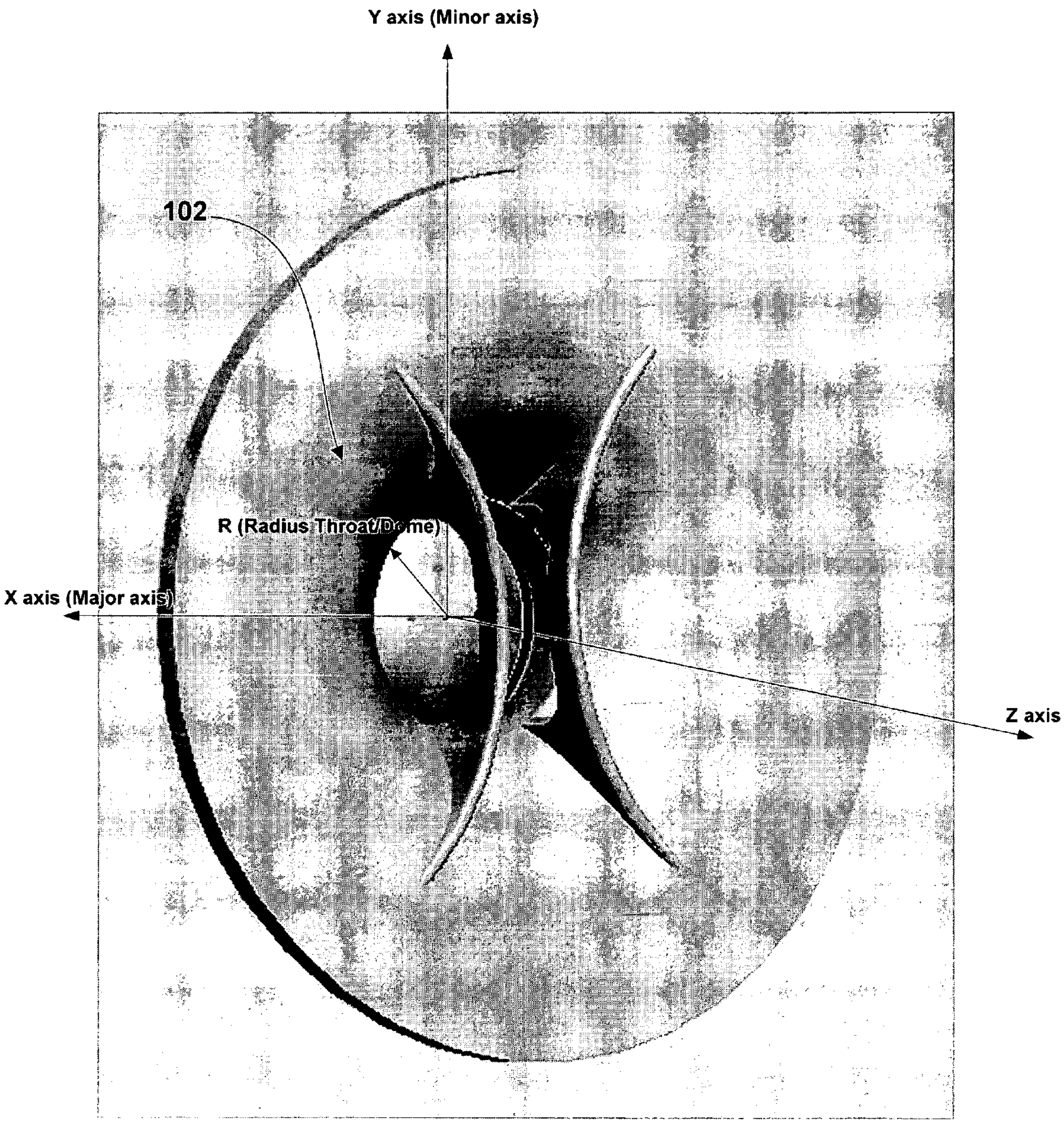
FIG. 5 illustrates the x-axis, y-axis, z-axis and the radius r for an example waveguide.

The next step 304 of FIG. 3 is creating an exponential waveguide profile with two or more different exponential slopes concatenated together. To create this concatenated exponential waveguide profile, several input variable must first be provided, such as (i) the diameter or radius of the loudspeaker driver (or the initial radius or diameter of the throat of the waveguide); (ii) the initial slope of the waveguide along the x-axis (or major axis) and the initial slope of the waveguide along the y-axis (or minor axis); and (iii) the depth of the waveguide along the z-axis. FIG. 5 illustrates the x-axis, y-axis, z-axis and the radius r for an example waveguide for which the initial input variables may be obtained.

Figure 6:
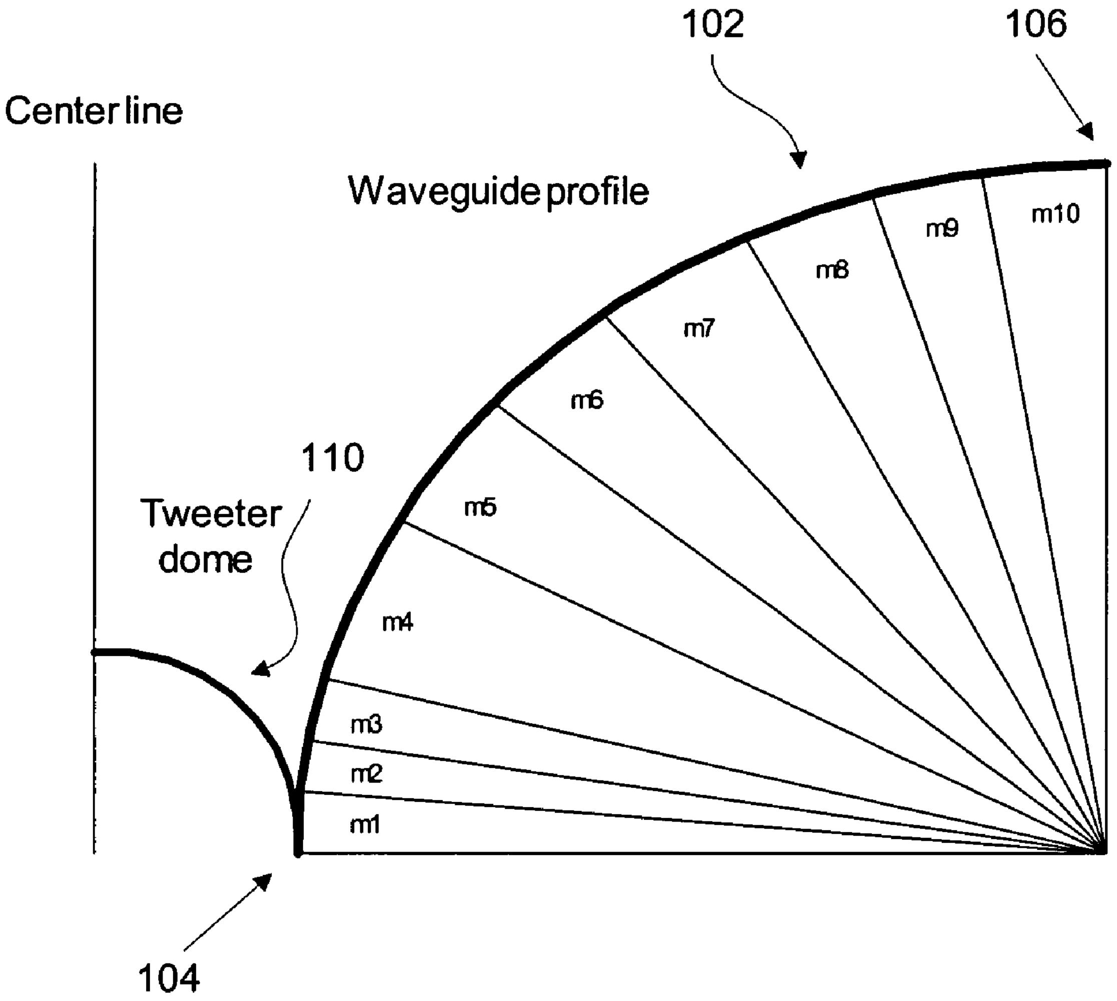
FIG. 6 illustrates a waveguide divided into ten (10) sections.

Once the initial input variables are obtained, a waveguide having two or more concatenations may be created using the functions set forth below. As seen in FIG. 6, which illustrates a waveguide 102 divided into ten section, m1, m2, m3, m4, m5, m6, m7, m8, m9 and m10, in the example embodiment, the waveguide 102 is divided into ten sections which are concatenated together as described in more detail below. The sections may be defined by sections of equal length along the depth of the waveguide. For example, if the depth is set at 1 inch, each section shall be 1/10 of an inch, or 0.10 inches. Although the example implementation divides the waveguide into ten sections, one skilled in the art will recognize that a waveguide profile may be obtained from two or more section that are concatenated together using the methodology of the invention as described in more detail below.

The slope m of each section of the waveguide is derived by starting with the initial slope input along the x and y axis and modifying or updating the slope for each section along both axis such that the slope is optimal for a minimum change in acoustic reactance at the given frequency. The optimal slope for minimum change in acoustic reactance at a given frequency may be obtained from the derivate expressions of acoustic reactance at high and low frequencies.

As previously discussed, for low frequencies, acoustic reactance is expressed as:

$$X_{AT} = \frac{\rho_0 c}{S_T}\left(\frac{m}{2k} - \sqrt{\frac{m^2}{4k^2} - 1}\right)$$

For high frequencies, acoustic reactance is expressed as:

$$X_{AT} = \frac{\rho_0 c^2 m}{2\varpi S_T}$$

From these equations, the derivatives of the acoustic reactance with respect to low and high frequencies may be expressed, respectively, as the following functions:

$$\frac{\partial X_{AT}}{\partial f} = \frac{\rho_0 c}{S_T}\left(\frac{\left(\frac{mc}{8\pi f}\right)^2 \frac{1}{f}}{\sqrt{\left(\frac{mc}{8\pi f}\right)^2 - 1}} - \frac{mc}{4\pi f^2}\right),$$

low frequency derivative $$\frac{\partial X_{AT}}{\partial f} = -\frac{\rho_0 c}{S_T}\frac{mc}{4\pi f^3}, \text{ high frequency derivative}$$

From these derivates, an optimization routine with respect to low frequencies for the slope m may be defined by the following:

$$\left(\frac{mc}{8\pi f}\right)^2 \frac{1}{f} - \frac{mc}{4\pi f^2}\sqrt{\left(\frac{mc}{8\pi f}\right)^2 - 1} = 0$$

Solving for m with respect to frequency we obtain an optimal slope for a minimum change in acoustic reactance at low frequencies as:

$$m_{Low\ frequencies} = \frac{8\pi f}{c} = 4k$$

While optimization for low frequencies is a helpful metric, it is advantageous to review an approach that considers the transition between low and high frequencies along the transition of the waveguide from the throat to the mouth of the waveguide. An alternate solution that captures a minimum change in the acoustic reactance between low and high frequencies along the throat of the waveguide may be defined as well.

When equating the magnitude of the derivatives for respective low and high frequency expressions of acoustical reactance, we obtain:

$$\left\|\frac{\partial X_{AT}}{\partial f}\right\| = \left\|\frac{\rho_0 c}{S_T}\left(\frac{\left(\frac{mc}{8\pi f}\right)^2 \frac{1}{f}}{\sqrt{\left(\frac{mc}{8\pi f}\right)^2 - 1}} - \frac{mc}{4\pi f^2}\right)\right\| = \left\|\frac{\rho_0 c}{S_T}\frac{mc}{4\pi f^2}\right\|$$

Solving for m with respect to frequency, we obtain an optimal slope that minimizes discontinuities in acoustic reactance from low to high frequencies along the transition of the waveguide from throat to mouth:

$$m_{Low\ to\ High\ frequencies} = \frac{16}{\sqrt{15}}\frac{2\pi f}{c} = \frac{16}{\sqrt{15}}k$$

When considering the optimal slopes defined for a minimum in the derivative of the acoustic reactance, a specific slope update may be defined for each section of the waveguide. As such, the updates may be partitioned numerically into different regions. Optimal average updates can them be determined based upon the data generated from partitioning the waveguide in different regions. Smaller average slope updates may be used for the design of waveguides having shallower desirable depths.

Tables 1, 2 and 3 illustrate three different partitions of waveguides divided into ten sections having regions of particular interest between 1.5 kHz to 6 kHz. Each of the scaled slope updates in each of the different partitions of the tables are defined by the equations set forth below where the particular partitioning frequency divides the application of the equations:

$$m_{Low\ frequencies} = \frac{8\pi f}{c} = 4k \text{ and}$$

$$m_{Low\ to\ High\ frequencies} = \frac{16}{\sqrt{15}}\frac{2\pi f}{c} = \frac{16}{\sqrt{15}}k$$

TABLE 1

Slope Update Partition (A).

| Slope Transition | Frequency(Hz) | Slope Update |
|---|---|---|
| m10(low) | 1000 | 0.136475364 |
| m9(low) | 2000 | 0.068237682 |
| m8(low) | 3000 | 0.045491788 |
| m7(low) | 4000 | 0.034118841 |
| Average Update | | 0.071080919 |
| m6(low to high) | 5000 | 0.026428341 |
| m5(low to high) | 6000 | 0.022023617 |
| m4(low to high) | 7000 | 0.018877386 |
| m3(low to high) | 8000 | 0.016517713 |
| m2(low to high) | 9000 | 0.014682411 |
| m1(low to high) | 10000 | 0.01321417 |
| Average Update | | 0.01862394 |

TABLE 2

Slope Update Partition (B).

| Slope Transition | Frequency(Hz) | Slope Update |
|---|---|---|
| m10(low) | 1000 | 0.136475364 |
| m9(low) | 2000 | 0.068237682 |
| m8(low) | 3000 | 0.045491788 |
| Average Update | | 0.083401611 |
| m7(low to high) | 4000 | 0.033035426 |
| m6(low to high) | 5000 | 0.026428341 |
| m5(low to high) | 6000 | 0.022023617 |
| m4(low to high) | 7000 | 0.018877386 |
| m3(low to high) | 8000 | 0.016517713 |
| m2(low to high) | 9000 | 0.014682411 |
| m1(low to high) | 10000 | 0.01321417 |
| Average Update | | 0.020682723 |

TABLE 3

Slope Update Partition (C).

| Slope Transition | Frequency(Hz) | Slope Update |
|---|---|---|
| m10(low) | 1000 | 0.136475364 |
| m9(low) | 2000 | 0.068237682 |
| m8(low) | 3000 | 0.045491788 |
| m7(low) | 4000 | 0.034118841 |
| m6(low) | 5000 | 0.027295073 |
| m5(low) | 6000 | 0.022745894 |
| Average Update | | 0.05572744 |
| m4(low to high) | 7000 | 0.018877386 |
| m3(low to high) | 8000 | 0.016517713 |
| m2(low to high) | 9000 | 0.014682411 |
| m1(low to high) | 10000 | 0.01321417 |
| Average Update | | 0.029025561 |

As illustrated, the above Tables 1–3 are derived assuming a frequency range of 1–10 kHz, commencing with the lowest frequency of 1 kHz applied to m10 or the mouth section. Thereafter, the frequencies are assigned in 1 kHz increments to each section, where the last section m1 , or throat section, is assigned a frequency of 10 kHz. Table 1 calculates the slope update for each of the ten sections (m1–m10) by applying the equation for rate of flare at low frequency from a frequency range of 1 kHz to 4 kHz, then applies the equation for rate of flare from low to high frequency from 5 kHz to 10 kHz.

Table 2 calculates the slope update for each of the ten sections (m1–m10) by applying the equation for rate of flare at low frequency from a frequency range of 1 kHz to 3 kHz then applies the equation for rate of flare from low to high frequency from 4 to 10 kHz. Similarly, Table 3 applies the equation for rate of flare at low frequency from a frequency range of 1 kHz to 6 kHz then applies the equation for rate of flare from low to high frequency from 7 to 10 kHz. While the above tables calculate the change in the rate of slope for particular regions of interest from 1.5 kHz to 6 kHz applying the design technique of using ten section to support contributions from 1–10 kHz, the above tables may be generated from other frequency regions of interest, such as 6 kHz to 12 kHz, 12 to 20 kHz or 20 kHz to 40 kHz.

The partitions outlined in Tables 1, 2 and 3 may be used as a basis to update the slopes in update equations that may used in a waveguide design software code, two example commented code implementations of which may be found below.

Slope Update Routine (A)

```
% Composite Exponential Waveguide Consisting of "i" Sections.
  for i=1:10,
    if m1x<0.6
      m1x=m1x+0.0375*i; % Increased rate of flare.
    elseif m1x<0.7
      m1x=m1x+0.0575*i; % Considerably increased rate of flare.
    else
      m1x=m1x+0.0775*i; % Considerably increased rate of flare.
    end
    if m1y<0.6
      m1y=m1y+0.0275*i; % Increased rate of flare.
    elseif m1y<0.8
      m1y=m1y+0.0675*i; % Considerably increased rate of flare.
    else
      m1y=m1y+0.0875*i; % Considerably increased rate of flare.
    end
```

Slope Update Routine (B)

```
% Composite Exponential Waveguide Consisting of "i" Sections.
  for i=1:10,
    if m1x<0.6
      m1x=m1x+0.0175*i; % Increased rate of flare.
    elseif m1x<0.7
      m1x=m1x+0.0275*i; % Considerably increased rate of flare.
    else
      m1x=m1x+0.0475*i; % Considerably increased rate of flare.
    end
    if m1y<0.6
      m1y=m1y+0.0275*i; % Increased rate of flare.
    elseif m1y<0.8
      m1y=m1y+0.0475*i; % Considerably increased rate of flare.
    else
      m1y=m1y+0.0675*i; % Considerably increased rate of flare.
    end
```

The slope update variables selected above may be based upon the average slope update obtained for each partition in the Tables above. The average update used is selected to be implementable, realizable and as close to an optimal solution as possible given the design parameters. Waveguides of large depths may accommodate greater rates of change since the transitions between the sections are larger. Thus, one skilled in the art may vary the update variables based upon the depth of the preferred waveguide design. Further, when the slope update routines are based upon elliptical waveguide designs, where the width of x-axis is typically longer than that of the y-axis, the rate of change in the slope may be more gradual along the x-axis than along the y-axis. When designing a circular waveguide, the rate of change may be equal along both axis, and thus the routines for each axis may be identical, or as set forth above, may still vary producing a circular waveguide having elliptical dispersion patterns.

Slope update routine A was developed to support alternate dispersion coverage for larger and deeper waveguides since the initial and cumulative rate of change is larger than Slope Update Routine B. Consequently, due to larger respective wavelengths, Slope Update Routine A would provide lower frequency response. Slope Update Routine B was used to implement a smaller and shallow waveguide with particular dispersion coverage. The two illustrations demonstrate the flexibility in the application of the methodology. Similarly, those skilled in the art could use a series of polynomial update functions to obtain a solution that provides performance in keeping with the design standard.

For example, the above Slope Update Routine B was established for the purposes of creating a waveguide profile having a shallow depth of approximately 1 inch. Thus, the average slope updates of Table 3 were used as a basis for designing the Slope Update Routine B because of the rate of change in slope would produce a more optimal profile given the shallow depth of the waveguide. Thus, the average slope update rate for the low frequency of Table 3 was used as a guideline to define the two upper rates of change along the y-axis for the Slope Update Routine B (i.e. 0.05572744 falls between 0.0475 and 0.0675). The lowest rate update along the y-axis was then used as the middle range update rate along the x-axis. The average slope update rate for the low to high frequencies of Table 3 was then used as a guideline to define the two upper rates of change along the y-axis (i.e. 0.029025561 falls between 0.0275 and 0.0475). As will be demonstrated below, the above routine can also be used to design a waveguide having a mouth with a circular pattern, yet having elliptical acoustic dispersion characteristics.

Using a slope update routine or formula implemented for an optimal solution given the design parameters, the slope of each section may be determined in a cumulative manner beginning with the initial slope input. For example, using the Slope Update Routine B, as set forth above, if the initial slope along the x-axis is 0.55 the initial slope m1 will be updated to 0.56175 (0.55+(0.0175*1)). For m2, the slope will be 0.59675 (0.56175+(0.0175*2)) and for m3 will be 0.64925 (0.59675+(0.0175*3)). For m4, the slope will be 0.75925 (0.64925+(0.0275*4)). Updates for sections m5–m10 may follow cumulatively by the continued application of the Slope Update Routine B for the x-axis. The slopes for each section on the y-axis may be similarly calculated using the portion of the routine for cumulatively updating the slopes along the y-axis.

Once all the slopes m1–m10 are established based upon the update formulas, the slopes may then be concatenated together based upon the initial radius of the desired waveguide profile at its throat and the depth of the desired waveguide profile design. One method for concatenating the sections together is to plot the radius (or height) of the waveguide along the x and y axis against the depth (z-axis) on a 100×10 matrix against the rate of flare m for each section defined by the updated slopes for each section. The first section m1 in the matrix may be defined by 1:10, 1, section m2 by 11:20, 2, section m3 is 21:30, 3 and etc. Given a depth of 1 inch, the percentage of depth inches per each point 1:100 on the matrix will be 0.01 inches. The height may then be determined along the matrix 1:100 (depth 1:100) based upon the established design metrics. For example, in this example implementation, the height at each 0.01 inches of depth from throat to mouth may be defined by the following equation:

$$\text{Outer\_Radius(depth,subsection)}=(\text{Constant})^*(\text{Starting\_radius}^*(\exp(m1x^*\text{depth})))$$

The concatenated sections m1–m10 can then be smoothed using a polynomial function order curve fit, using a order approximation that may set as an input variable, to create a waveguide profile, which may used as a design key for the waveguide profile. Both the concatenated sections and the smoothed concatenated section may be plotted on a matrix. Example of various plots of waveguide profiles are illustrated in FIGS. 7–17, as explained in further detail below.

Figure 7:
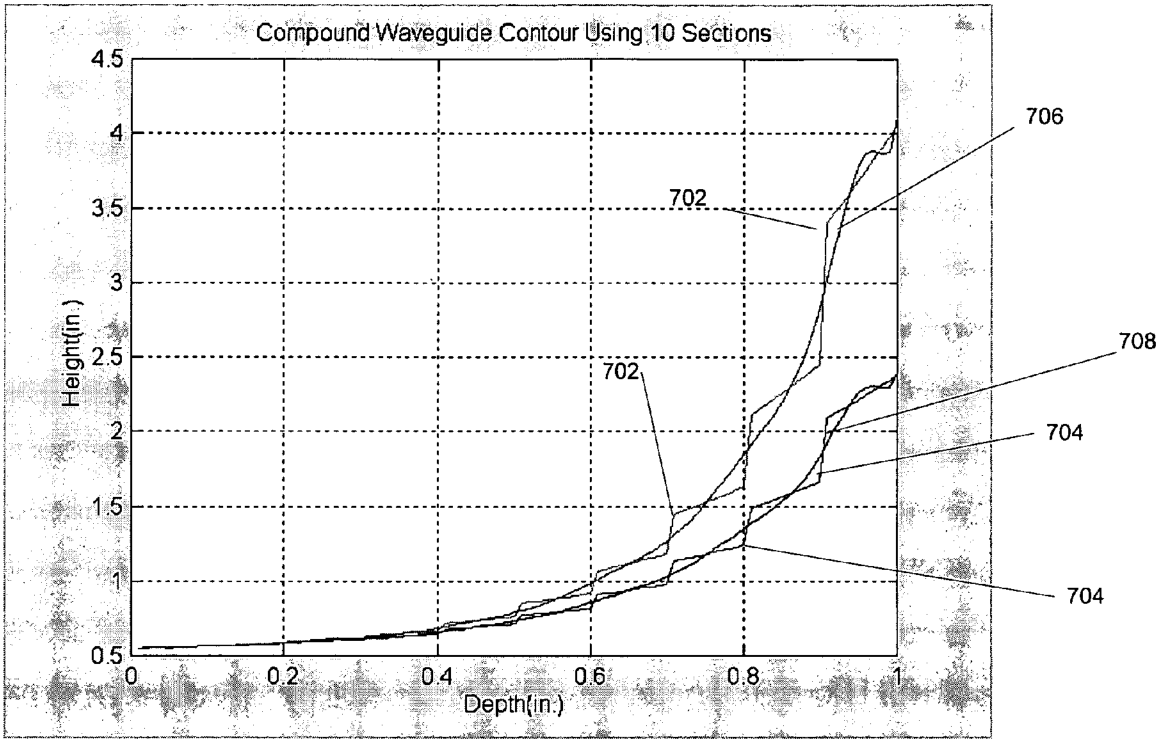
FIG. 7 illustrates a depth verses height profile of an example waveguide designed in accordance with the invention.

FIG. 7 illustrates a depth vs. height profile of an example waveguide designed in accordance with the invention, using the Slope Update Routine A, set forth above. The initial parameters of the example profile of FIG. 7 include a throat radius of 0.55 inches, an initial slope on the x-axis of 0.55, and initial slope on the y-axis of 0.55, a depth of 1.0 inch and a polynomial function order of 16. The concatenated updated slopes m1–m10 along the x-axis are illustrated by 702, while the concatenated updated slopes m1–m10 along the y-axis are illustrated by 704. The smoothed curve in accordance with the polynomial fit curve function is illustrated by 706 for the x-axis and by 708 for the y-axis.

Figure 8:
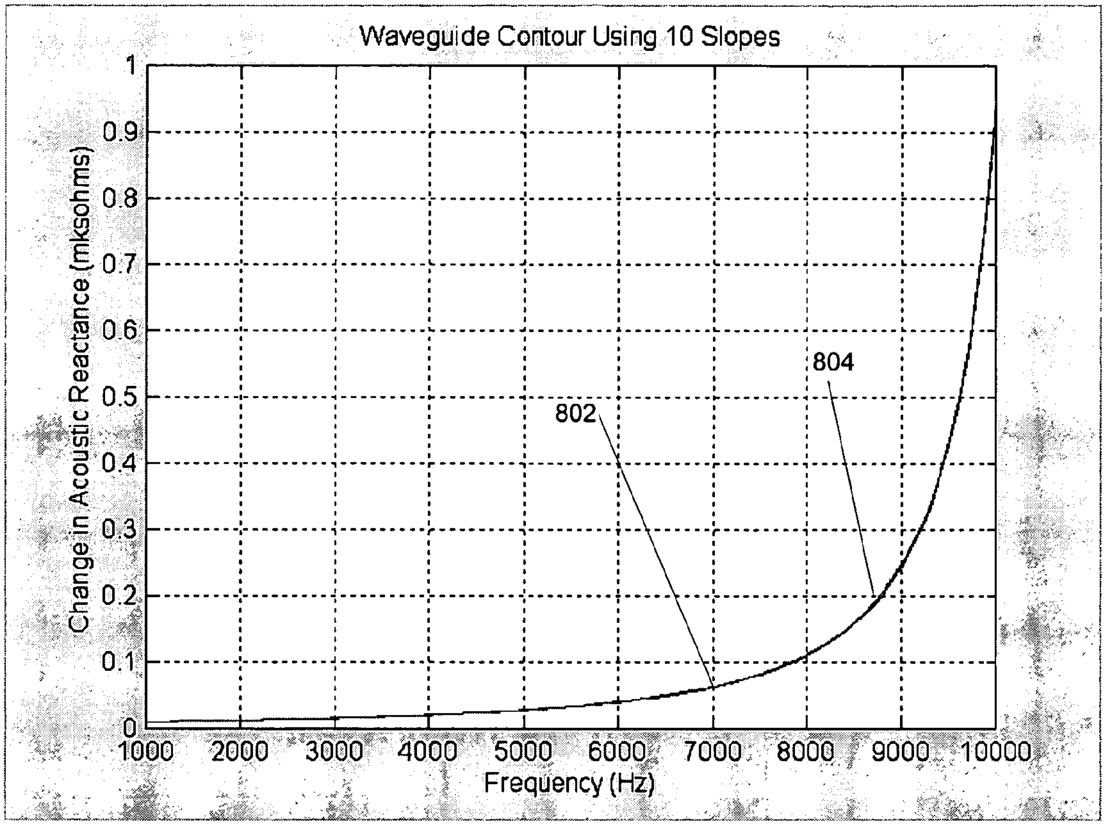
FIG. 8 illustrates the predicted change in acoustic reactance verses frequency along the x and y axis for the waveguide profile of FIG. 7.

FIG. 8 illustrates the change in acoustic reactance verses frequency along the x and y axis for the waveguide profile of FIG. 7. As illustrated by FIG. 8, the change in acoustic reactance along the x-axis 802 is the same and the change in acoustic reactance along the y-axis 804. The change in acoustic reactance along the x and y-axis may be calculated based upon the updated slopes for each section using the established design metrics for the change in acoustic reactance without the necessity of creating a prototype to test the performance of the waveguide. Although FIG. 7 illustrates a waveguide having an elliptical profile, the predicted changes in acoustic reactance along the x and y-axis of the elliptical waveguide are analogous to the performance of a waveguide having a circular design profile.

Figure 9:
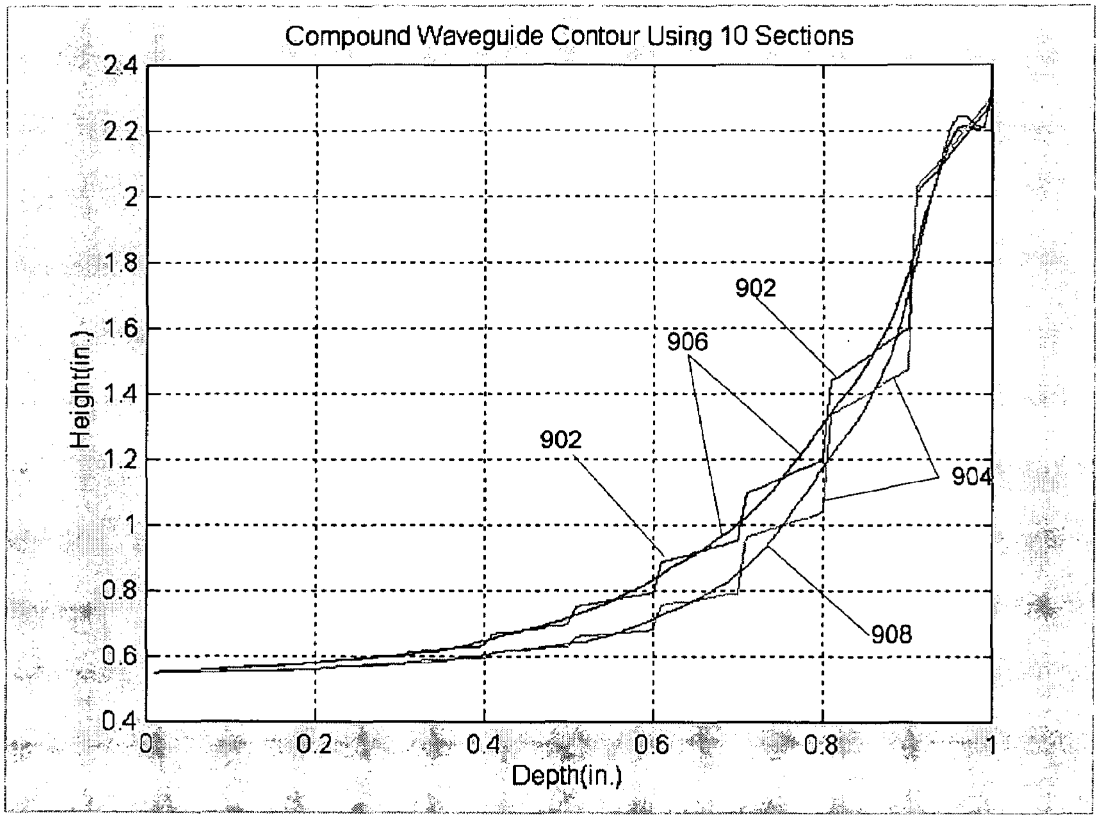
FIG. 9 illustrates a depth verses height profile of another example waveguide designed in accordance with the invention.

FIG. 9 illustrates a depth verses height profile of an example waveguide designed in accordance with the invention, using Slope Update Routine B, as set forth above. The initial parameters of the example profile of FIG. 9 include a throat radius of 0.50 inches, an initial slope on the x-axis of 0.50, and initial slope on the y-axis of 0.1375, a depth of 1.0 inch and a polynomial function order of 16. The concatenated updated slopes m1–m10 along the x-axis are illustrated by 902, while the concatenated updated slopes m1–m10 along the y-axis are illustrated by 904. The smoothed curve in accordance with the polynomial fit curve function is illustrated by 906 for the x-axis and by 908 for the y-axis.

Figure 10:
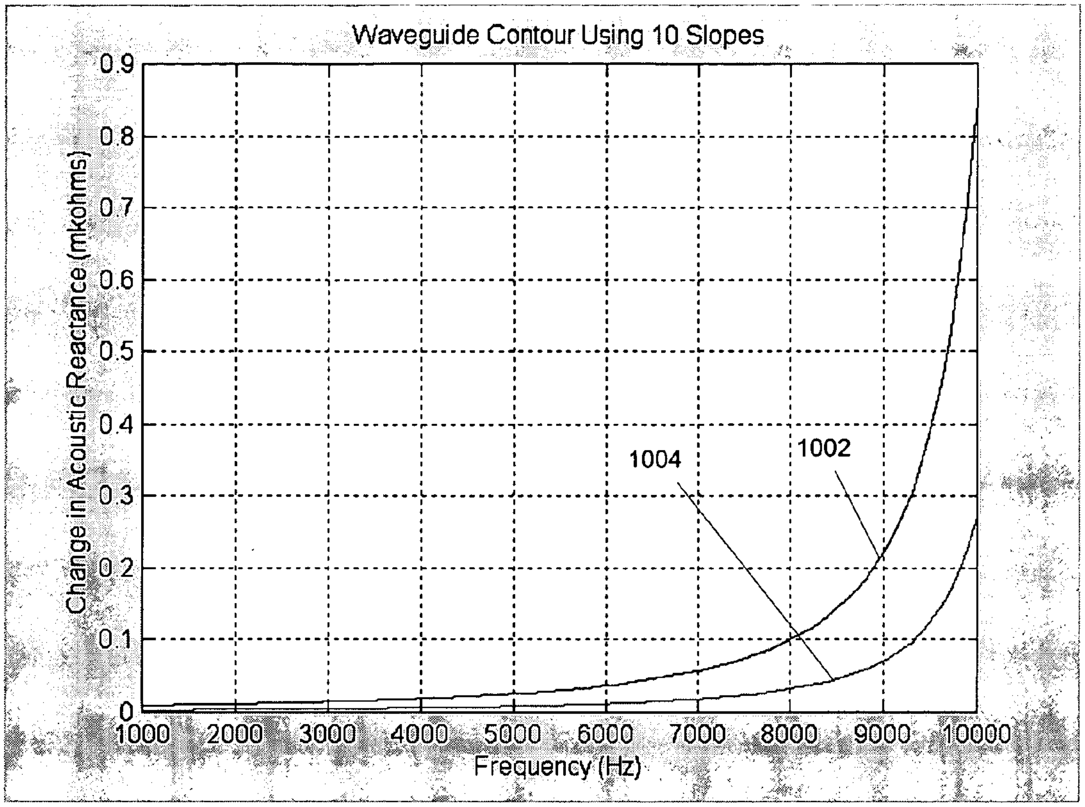
FIG. 10 illustrates the change in acoustic reactance verses frequency along the x and y axis for the waveguide profile of FIG. 9.
Figure 11:
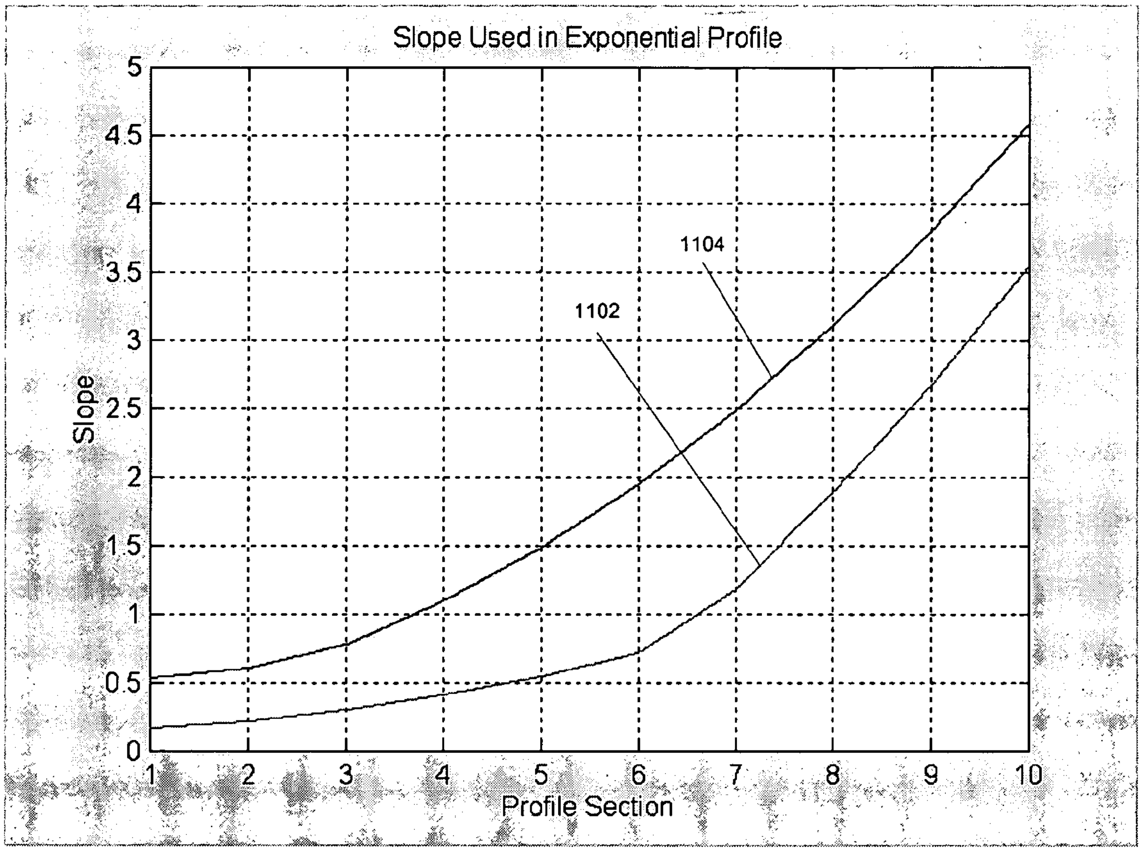
FIG. 11 illustrates the slope profile for each section of the waveguide illustrated in FIGS. 9 and 10 along the x and y-axis.

FIG. 10 illustrates the change in acoustic reactance verses frequency along the x and y axis for the waveguide profile of FIG. 9. As illustrated by FIG. 10, the change in acoustic reactance along the x-axis 1002 differs slightly from the change in acoustic reactance along the y-axis 1004. As before, the change in acoustic reactance along the x and y-axis may be calculated based upon the updated slopes for each section using the established design metrics for the change in acoustic reactance without the necessity of creating a prototype to test the performance of the waveguide. Although FIG. 9 illustrates a waveguide having a circular profile, the predicted changes in acoustic reactance along the x and y-axis of the circular waveguide are analogous to the performance of a waveguide having an elliptical design profile FIG. 11 illustrates the slope profile for each section of the waveguide illustrated in FIGS. 9 and 10 along the x and y axis. The slope profile for the x-axis is represented by 1102 and illustrates the concatenated and smoothed slope profile of the updated slopes for sections m1–m10 along the x-axis. Similarly, the slope profile for the y-axis is represented by 1104 and illustrates the concatenated and smoothed slope profile of the updated slopes for sections m1–m10 along the y-axis.

Figure 12:
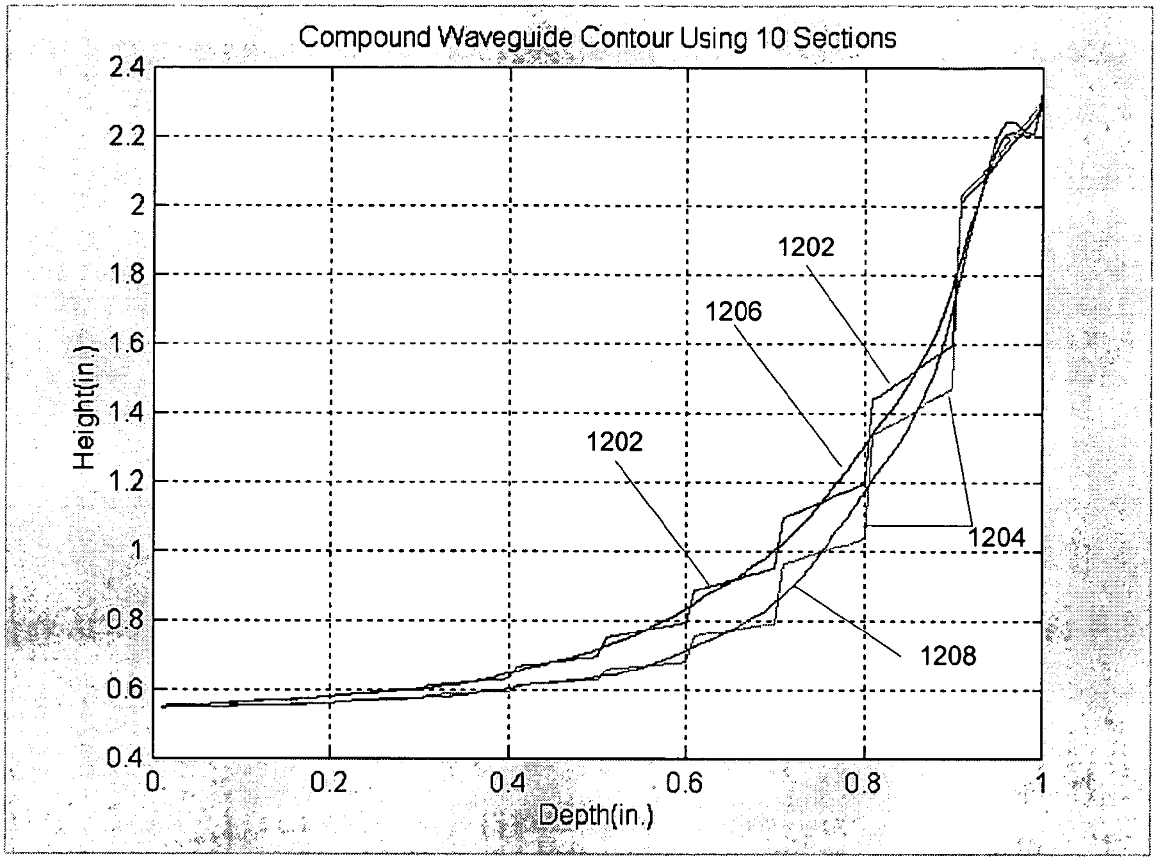
FIG. 12 illustrates a depth verses height profile of another example waveguide designed in accordance with the invention.

FIG. 12 illustrates a depth verses height profile of an example waveguide designed in accordance with the invention, using Slope Update Profile B. The initial parameters of the example profile of FIG. 12 include a throat radius of 0.55 inches, an initial slope on the x-axis of 0.55, and initial slope on the y-axis of 0.1375, a depth of 1.0 inch and a polynomial function order of 16. The concatenated updated slopes m1–m10 along the x-axis are illustrated by 1202, while the concatenated updated slopes m1–m10 along the y-axis are illustrated by 1204. The smoothed curve in accordance with the polynomial fit curve function is illustrated by 1206 for the x-axis and by 1208 for the y-axis.

Figure 13:
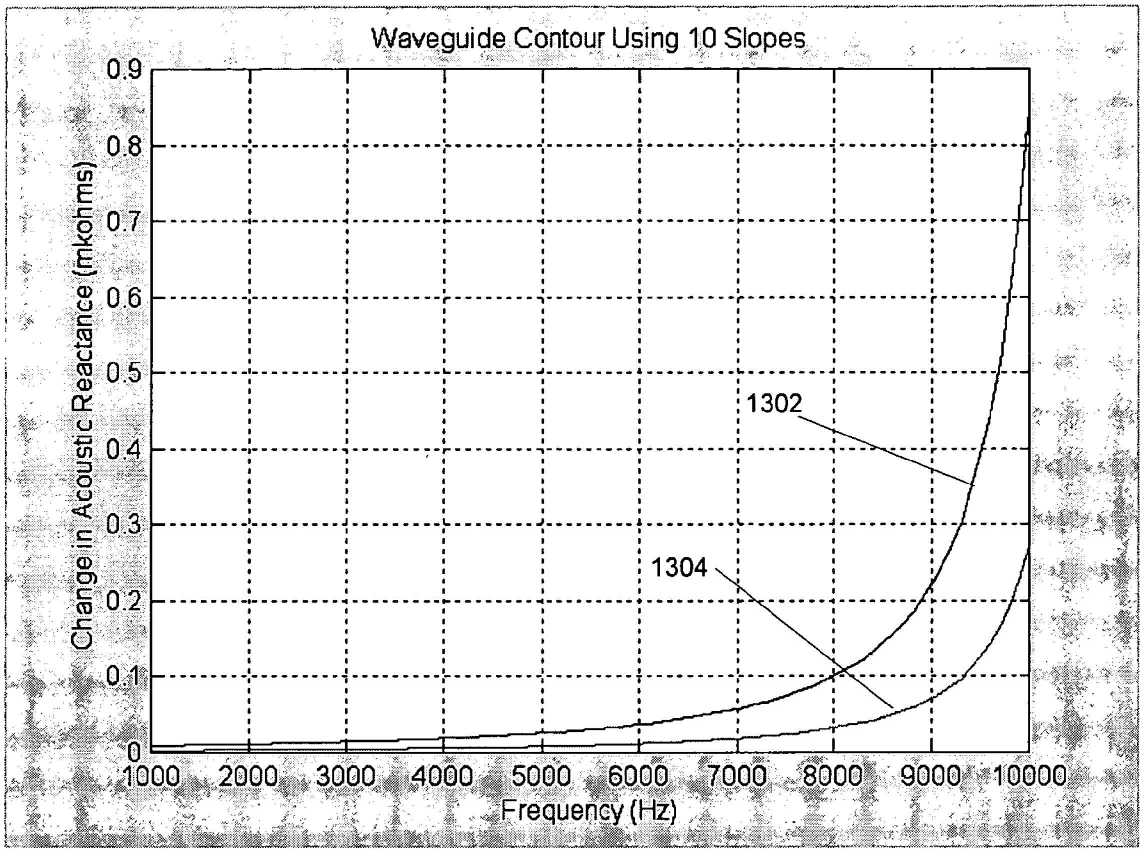
FIG. 13 illustrates the change in acoustic reactance verses frequency along the x and y axis for the waveguide profile of FIG. 12.

FIG. 13 illustrates the change in acoustic reactance verses frequency along the x and y-axis for the waveguide profile of FIG. 12. As illustrated by FIG. 12, the change in acoustic reactance along the x-axis 1302 differs slightly from the change in acoustic reactance along the y-axis 1304. As before, the change in acoustic reactance along the x and y axis may be calculated based upon the updated slopes for each section using the established design metrics for the change in acoustic reactance without the necessity of creating a prototype to test the performance of the waveguide. Although FIG. 12 illustrates a waveguide having a circular profile, the predicted changes in acoustic reactance along the x and y axis of the circular waveguide are analogous to the performance of a waveguide having an elliptical design profile.

Figure 14:
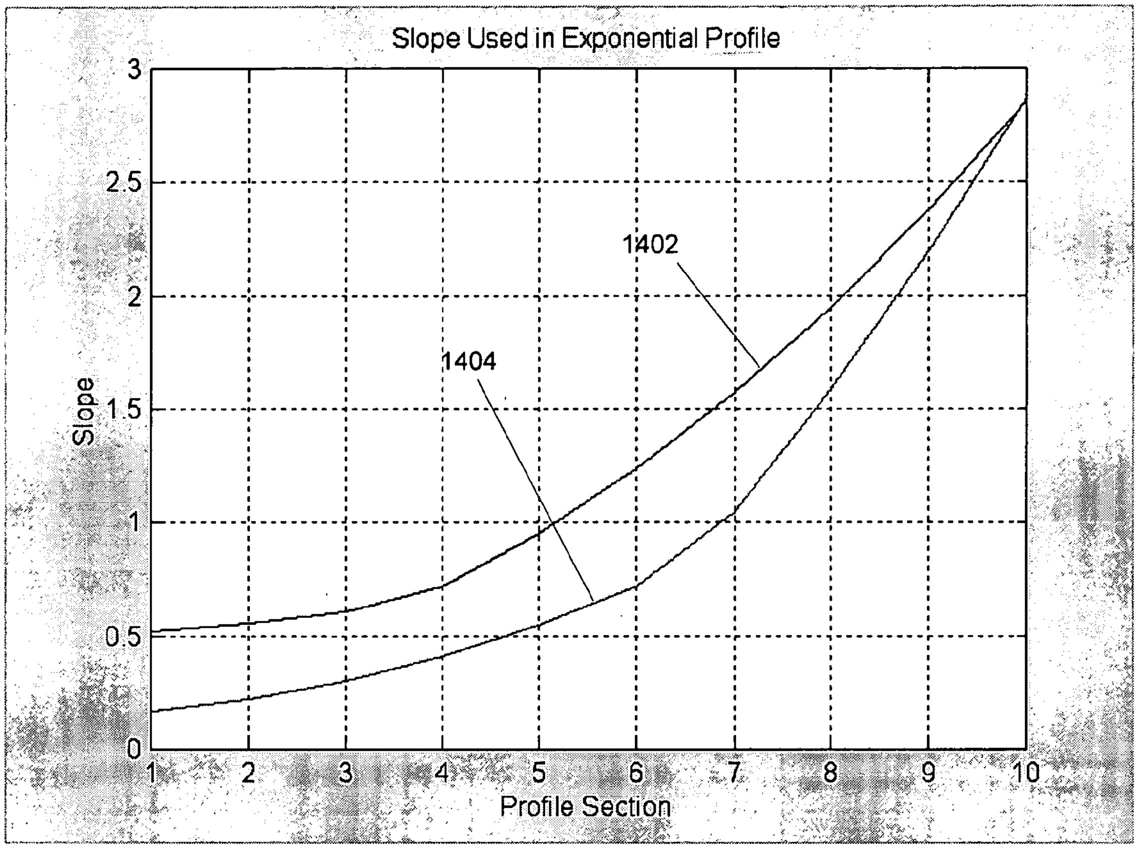
FIG. 14 illustrates the slope profile for each section of the waveguide illustrated in FIGS. 12 and 13 along the x and y-axis.

FIG. 14 illustrates the slope profile for each section of the waveguide illustrated in FIGS. 12 and 13 along the x and y axis. The slope profile for the x-axis is represented by 1402 and illustrates the concatenated and smoothed slope profile of the updated slopes for sections m1–m10 along the x-axis. Similarly, the slope profile for the y-axis is represented by 1404 and illustrates the concatenated and smoothed slope profile of the updated slopes for sections m1–m10 along the y-axis.

Figure 15:
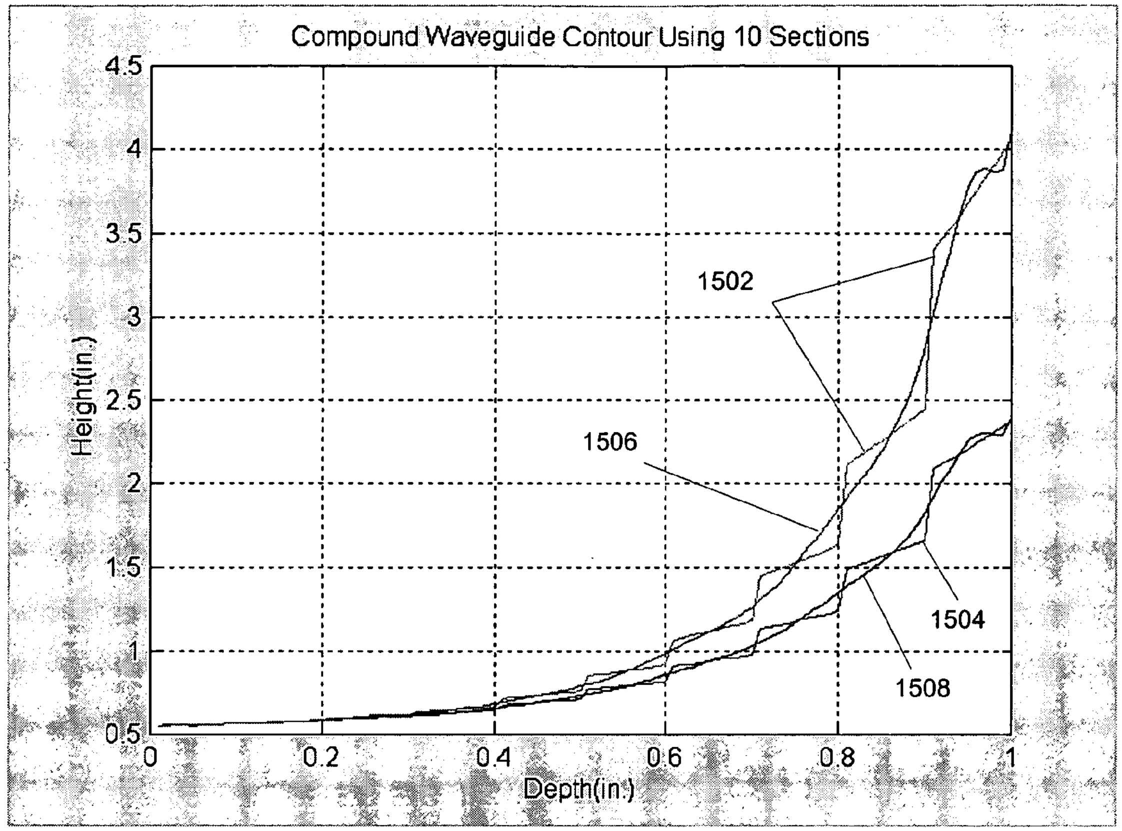
FIG. 15 illustrates a depth verses height profile of another example waveguide designed in accordance with the invention.

FIG. 15 illustrates a depth verses height profile of an example waveguide designed in accordance with the invention, using Slope Update Routine A. The initial parameters of the example profile of FIG. 15 include a throat radius of 0.55 inches, an initial slope on the x-axis of 0.55, and initial slope on the y-axis of 0.55, a depth of 1.0 inch and a polynomial function order of 16. The concatenated updated slopes m1–m10 along the x-axis are illustrated by 1502, while the concatenated updated slopes m1–m10 along the y-axis are illustrated by 1504. The smoothed curve in accordance with the polynomial fit curve function is illustrated by 1506 for the x-axis and by 1508 for the y-axis.

Figure 16:
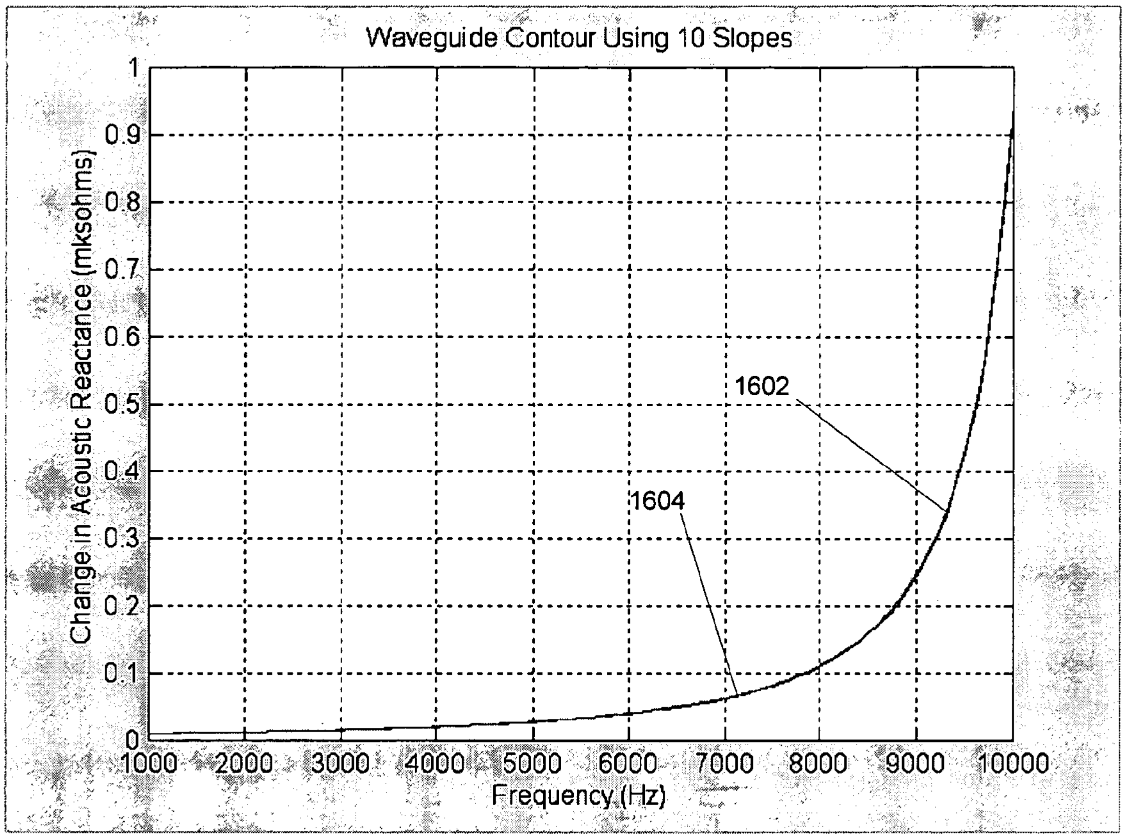
FIG. 16 illustrates the change in acoustic reactance verses frequency along the x and y axis for the waveguide profile of FIG. 15.

FIG. 16 illustrates the change in acoustic reactance verses frequency along the x and y axis for the waveguide profile of FIG. 15. As illustrated by FIG. 16, the change in acoustic reactance along the x-axis 1602 is the same and the change in acoustic reactance along the y-axis 1604. As before, the change in acoustic reactance along the x and y axis may be calculated based upon the updated slopes for each section using the established design metrics for the change in acoustic reactance. Although FIG. 16 illustrates a waveguide having an elliptical profile, the predicted changes in acoustic reactance along the x and y-axis of the elliptical waveguide are analogous to the performance of a waveguide having a circular design profile.

Figure 17:
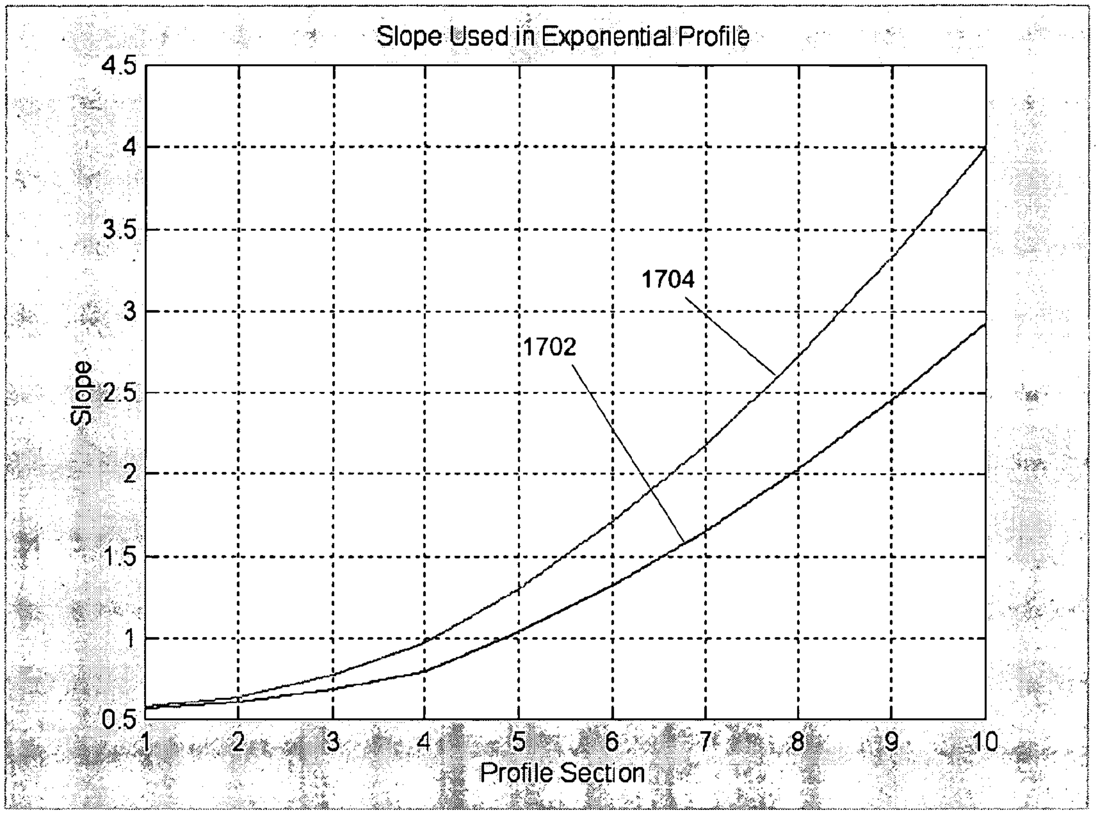
FIG. 17 illustrates the slope profile for each section of the waveguide illustrated in FIGS. 15 and 16 along the x and y-axis.

FIG. 17 illustrates the slope profile for each section of the waveguide illustrated in FIGS. 16 and 17 along the x and y axis. The slope profile for the x-axis is represented by 1702 and illustrates the concatenated and smoothed slope profile of the updated slopes for sections m1–m10 along the x-axis. Similarly, the slope profile for the y-axis is represented by 1704 and illustrates the concatenated and smoothed slope profile of the updated slopes for sections m1–m10 along the y-axis.

As illustrated above, by using the Slope Update Routines generated based upon the derived equations defining the optimal slope to minimizes discontinuities in acoustic reactance at low frequencies and from low to high frequencies, waveguides may be profiled to meet the performance standards of minimize the change in acoustic reactance along the waveguide at desired frequency. This is illustrated by measurements taken from a prototype fitting the design profile of the waveguide profile set forth in FIGS. 15–17.

Figure 18:
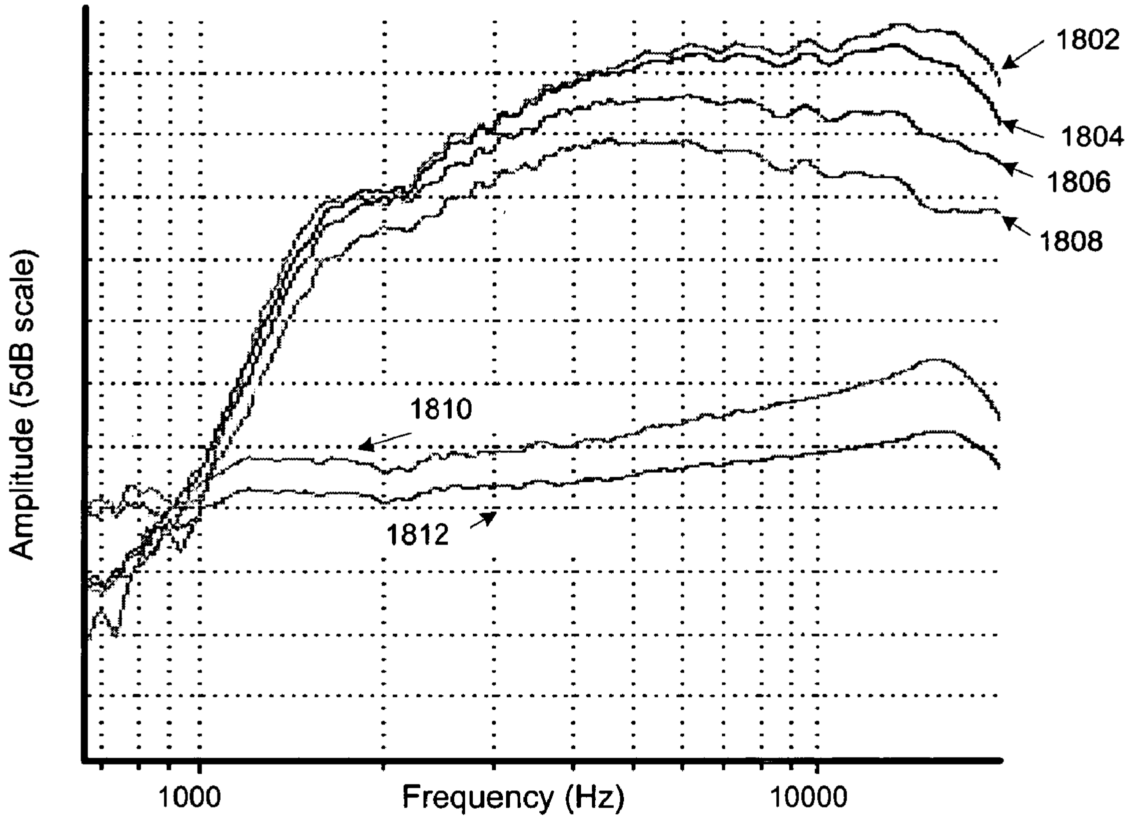
FIG. 18 illustrates the acoustic frequency response of the waveguide shown in FIGS. 1 and 5 used with an electrical second order high pass filter, highlighting the dispersion in the horizontal, vertical, and combination of horizontal and vertical directions.

FIG. 18 illustrates the acoustic frequency response of the waveguide shown in FIGS. 1 and 5 used with an electrical second order high pass filter, highlighting the dispersion in the horizontal, vertical, and combination of horizontal and vertical directions. The line identified as 1802 represents the on-axis response, which is generally defined as the direct radiating contribution. Line 1804 represents the listening window, which is representative of dispersion in nominal listening conditions. Line 1806 represents first reflection, which is the dispersion with annular interaction with listening room walls. Line 1808 represents sound power, which is dispersion with contribution of the waveguide in 360 degrees. Line 1810 is the directivity of sound power, while line 1812 is the directivity of first reflection. The directivity of sound power is the on-axis response subtracted from the sound power dispersion and defines uniformity of sound power dispersion or overall dispersion referenced to on-axis contribution. Directivity of first reflection is the on-axis response subtracted from the first reflection and defines the uniformity of the first reflection dispersion reference to on-axis contribution.

Figure 19:
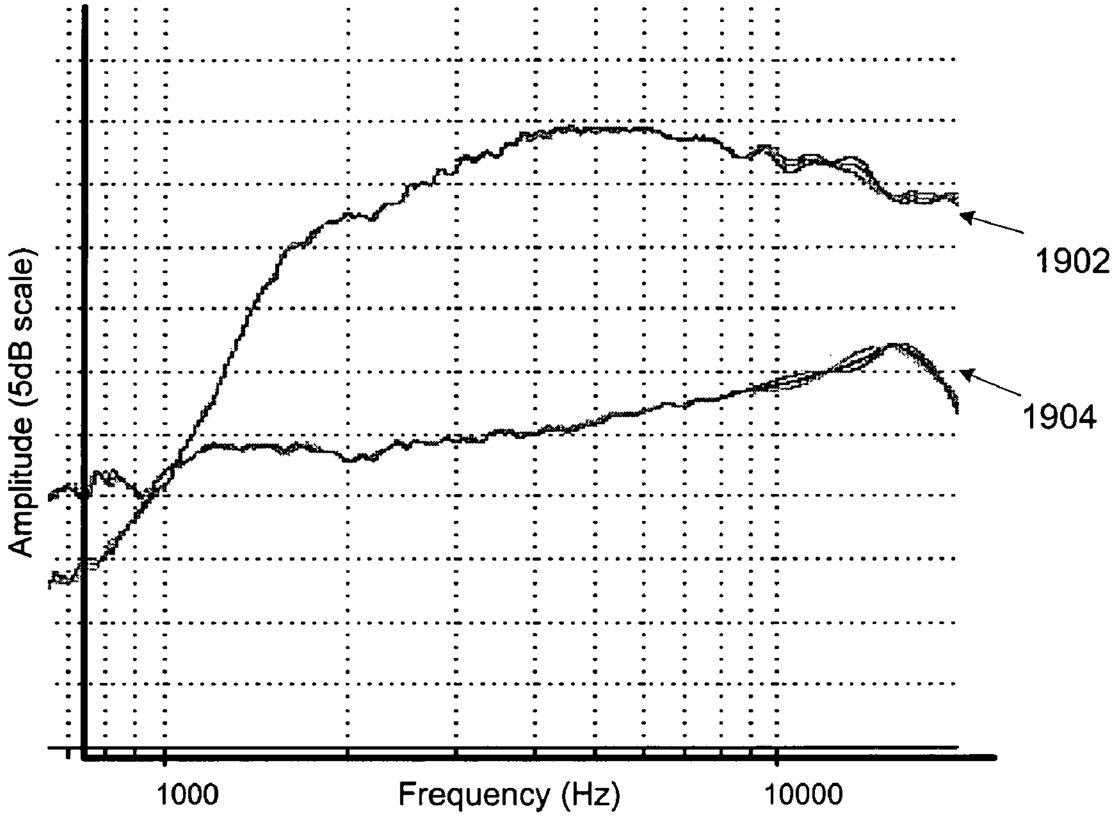
FIG. 19 illustrates the acoustic frequency response of the waveguide shown in FIGS. 1 and 5, highlighting the dispersion in the horizontal, vertical, and combination of horizontal and vertical directions.

FIG. 19 illustrates the acoustic frequency response of the waveguide shown in FIGS. 1 and 5, highlighting the dispersion in the horizontal, vertical, and combination of horizontal and vertical directions. In this FIG. 19, the on-axis response 1802 of FIG. 18, listening window 1804, first reflection, 1806, and sound power 1808 are overlaid on top of one another, represented by 1902, to demonstrate the similarities of the dispersions patterns of the waveguide under the various responses, in the frequency range of interest, which in this illustration is 1 kHz to 10 kHz. Similarly, lines 1810 and 1812, the directivity of sound power and directivity of first reflection, respectively, are overlaid, as illustrated by 1904, to demonstrate the similarities in dispersion patterns for these measurement in the frequency range of interest. As illustrated by FIGS. 18 and 19, the waveguide designed in accordance with the invention provides uniform coverage over a wide range of frequencies.

Further, as illustrate above, the Slope Update Routines A and B may be used to design waveguides having elliptical cross-sectional areas that produce circular dispersion patterns (i.e. an elliptical waveguide that produces the same horizontal and vertical dispersion patterns from low to high frequencies, which, by way of example, may be considered between 1 kHz to 10 kHz). Conversely, the design methodology allows for the profiling of waveguides having circular cross-sectional areas but that provide elliptical dispersion patterns (i.e. a circular waveguide that produces different horizontal and vertical dispersion patterns from low to high frequencies, which, maybe considered in range between 1 kHz to 10 kHz). To design an elliptical waveguide having circular dispersion characteristic, the initials slopes along the x and y-axis are substantially the same. In contrast, to design a circular waveguide having elliptical dispersion characteristics, the slopes along the x and y-axis may initially differ.

While the above described profiles can be generated by hand calculations and plotted from raw data, the above described methodology can be embodied in a software program that will calculate and the plot output data and smooth the curves based upon a polynomial order function. The software can also create output files containing the raw data as well as the plotted curves. The process may be performed by hardware or software and may be designed within known software programs, such as Matlab®, a software program sold under the registered trademark by The MathWorks, Inc., or may be designed as a standalone executable software program.

Figure 20:
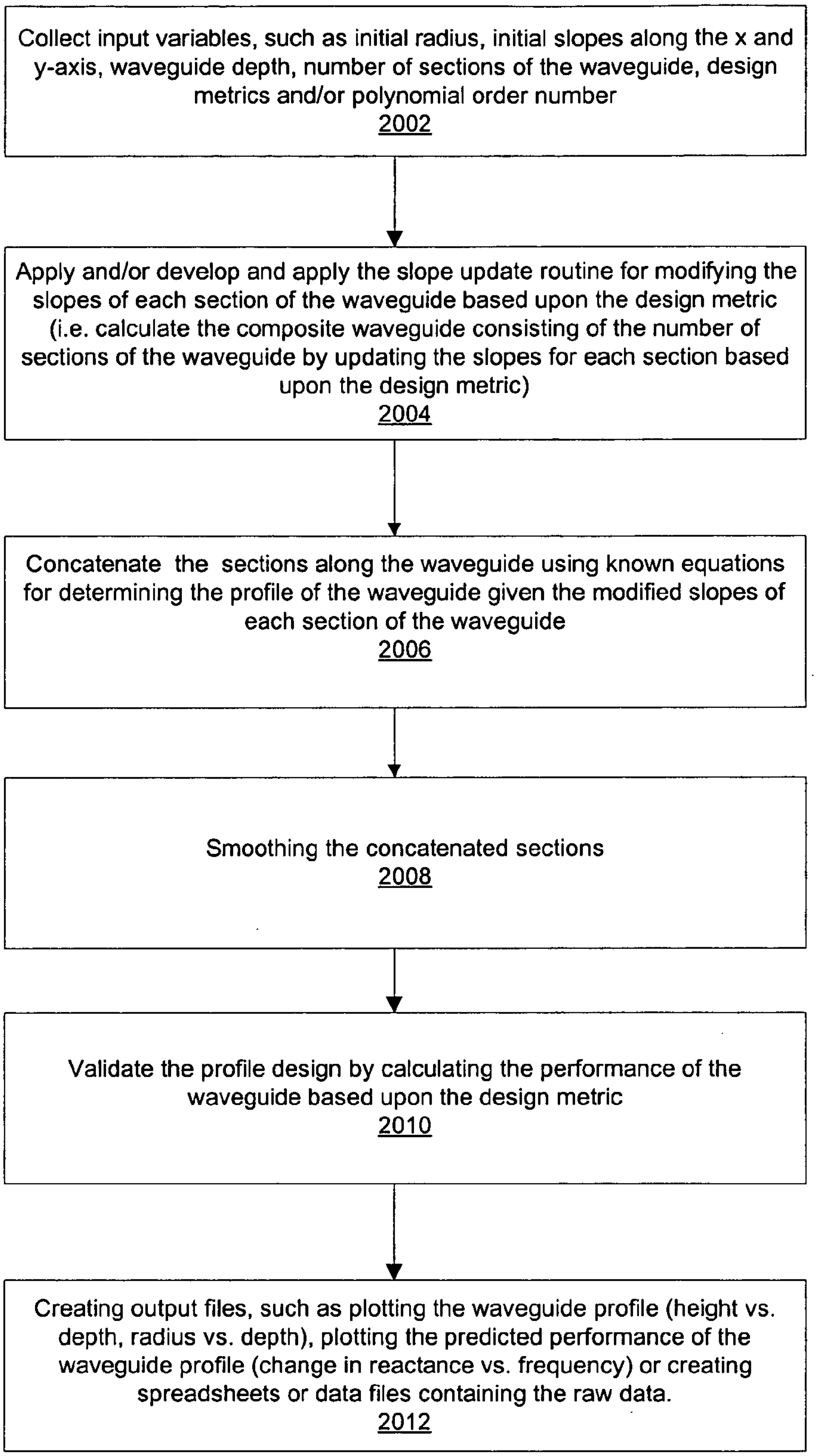
FIG. 20 is a flow diagram illustrating a design basis for a software program that performs according the methodology of the invention.

FIG. 20 illustrates a flow diagram that may be used as a design basis for a basic software program that performs according the methodology of the invention. One skilled in the art will recognize that the ordering of functions set forth in FIG. 20 may vary. For example, the initial input variable may be given before the design metric is chosen. Further, the program may be designed to give the user the choice of several design metrics. Additionally, the certain variables may be predetermined, such as the number of sections of the waveguide and the order number for the polynomial fit curve, or the variable may be input by the user.

As illustrated by the FIG. 20, the program may first ask for design input variables, such as initial throat radius, initial slope along the x and y-axis, waveguide depth, number of sections of the waveguide, the design metric and/or the polynomial order fit number 2002. Many of these design variables may, however, be predetermined, such as the depth of the waveguide, the number of sections of the waveguide, the polynomial order curve fit number and the design metric.

Once the input variable are collected, the program may then update the sections of the waveguide based upon the design metric 2004. If the design metric is predetermined, such as the change in acoustic reactance, the program may be design with predeveloped software routines, such that the Slope Update Routines A and B set forth above. However, these routines may be developed by the program based upon the input variables and then applied to update the slopes of the sections of the waveguide. Additionally, the software could be designed using other software routines for different design metrics, or may give the user the option of selecting different design metrics for the design of the waveguide, such as change in acoustic resistance, change in acoustic resistance, minimum change in acoustic resistance, minimum change in acoustic reactance, and then applying different slope updates for the selected design metric.

Once the slopes for each section have be defined or updated by the application of the design metric, the sections can then be concatenated together using known equations for determining the profile of a waveguide given the slopes of each section 2006. The concatenated sections can then be smoothed using a polynomial order fit curve or other similar method 2008 to create a design key for the waveguide.

The profile can then be validated by calculating the performance of the waveguide based upon the design metric 2010. Although not shown on FIG. 20, design iterations may be made to the profile if the performance calculations are undesirable or need improvement. The waveguide profiles and performance standards can be plotted and output files, such as excel spreadsheets, data files, text files or tables, can be generated from the raw and smoothed data 2012. One skilled in the art will recognize that the design iterations may be made to a software program of this type to add and remove features, to make the program more user friendly, to provide user options or to use the program to calculate or determine the slope update routines depending upon the design metric.

The process described above may be performed by hardware or software and may be designed within known software programs, such as Matlab, or may be designed as a standalone executable software program. If the process is performed by software, the software may reside in software memory (not shown) in the controller 1012, memory device 1014, Call Processor 1006, GPS module 308, or a removable memory medium. The software in memory may include an ordered listing of executable instructions for implementing logical functions (i.e., "logic" that may be implement either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. A signal-bearing medium encompasses a computer-readable medium. The computer readable medium may selectively be, for example but not limited to, an electronic, magnetic, optical, electromagnetic, infrared, or semiconductor system, apparatus, device, or propagation medium. More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The software may be processed by a processor such as general purpose microprocessor, application specific processor ("ASP"), digital signal processor ("DSP"), application specific integrated circuit ("ASIC"), and/or reduced instructions set integrated circuit ("RISC") processor.

While various embodiments of the invention have been described, it will be apparent to those of ordinary skill in the art that many more embodiments and implementations are possible within the scope of this invention. For example, the same principles used to design waveguides, as described herein, may be found used in radar and communication applications using analogous partitions, concatenations, and design metrics. Further, the waveguides may be the diaphragms of the loudspeakers. The design approach may also be applied to the design of port tube profiles found in loudspeaker systems, as well as, waveguides. The design approach in connection with the port tubes would require the application of appropriate functions for the desired port tube flare rates that are concatenated contributions of respective metrics that overall, increase the useable headroom of the port tubes in loudspeakers. Accordingly, the invention is not to be restricted except in light of the attached claims and their equivalents.

What is claimed is:

1. A method for creating a waveguide, the method comprising:

establishing a design metric based upon acoustic impedance;

dividing the waveguide into two or more sections;

setting initial design values;

modifying the values for each section in accordance with the design metric; and creating a waveguide in accordance with the modified values.

2. The method of claim 1, further comprising concatenating the sections together.

3. The method of claim 2, further smoothing the sections that are concatenated together.

4. The method of claim 1, where the design metric based upon acoustic impedance is the change in acoustic reactance between the sections of the waveguide.

5. The method of claim 1, where the design metric based upon acoustic impedance is the change in acoustic resistance between the sections of the waveguide.

6. The method of claim 1, where the design metric based upon acoustic impedance is the minimum change in acoustic resistance between the sections of the waveguide.

7. The method of claim 1, where the waveguide is a transducer diaphragm.

8. The method of claim 7, where the design metric based upon acoustic impedance is the change in acoustic impedance measured between the sections of transducer diaphragm.

9. The method of claim 1, where the waveguide is divided into five sections.

10. The method of claim 1, where the waveguide is divided into ten sections.

11. The method of claim 1, where the waveguide has a throat and a mouth and where the initial design values are dimensions of the throat and initial slopes of the waveguide on a major and a minor axis of the waveguide.

12. The method of claim 8, where initial slopes of the waveguide along a major and a minor axis are modified in accordance with the design metric based upon acoustic impedance.

13. The method of claim 9, where the slopes of each section of the waveguide are modified in accordance with the design metric based upon acoustic impedance.

14. The method of claim 1, where the waveguide is a port tube.

15. The method of claim 1 where the waveguide is designed for use in connection with a loudspeaker.

16. The method of claim 1 where the waveguide is designed for use in a radar application.

17. The method of claim 1 where the waveguide is designed for use in a communications application.

18. A method for creating a waveguide, the method comprising:

developing an initial waveguide profile with two or more different exponential slopes concatenated together;

modifying the slopes based upon a design metric based upon acoustic impedance;

smoothing the modified slopes based upon a polynomial order curve fit; and creating a waveguide in accordance with the smoothed modified slopes.

19. The method of claim 18, where the design metric based upon acoustic impedance is the change in acoustic reactance between the sections of the waveguide.

20. The method of claim 18, where the design metric based upon acoustic impedance is the change in acoustic resistance between the sections of the waveguide.

21. The method of claim 18, where the design metric based upon acoustic impedance is the minimum change in acoustic resistance between the sections of the waveguide.

22. The method of claim 18, where the waveguide is a transducer diaphragm.

23. The method of claim 18, where the design metric based upon acoustic impedance is the change in acoustic impedance measured between the sections of transducer diaphragm.

24. The method of claim 18, where the waveguide is divided into five sections.

25. The method of claim 18, where the waveguide is divided into ten sections.

26. The method of claim 18, where the waveguide has a throat and a mouth and where the initial waveguide profiles with two or more different exponential slopes concatenated together are designed by using initial design values.

27. The method of claim 26, where the initial design values are size of the throat and initial slopes of the waveguide on a major and a minor axis of the waveguide.

28. The method of claim 18, where the waveguide is a port tube.

29. The method of claim 18 where the waveguide is designed for use in connection with a loudspeaker.

30. The method of claim 18 where the waveguide is designed for use in a radar application.

31. The method of claim 18 where the waveguide is designed for use in a communications application.

32. A method for creating a waveguide for use in connection with a loudspeaker, the method comprising:

developing an initial waveguide profile with two or more different exponential slopes concatenated together by using initial design values for the waveguide;

modifying the concatenated slopes of the waveguide using the minimum change in acoustic resistance between the sections of the waveguide;

smoothing the modified slopes based upon a polynomial order curve fit; and creating a waveguide in accordance with the smoothed modified slopes.

33. The method of claim 32, where the waveguide is a transducer diaphragm.

34. The method of claim 32, where the waveguide is divided into five sections.

35. The method of claim 32, where the waveguide is divided into ten sections.

36. The method of claim 32, where the initial design values are size of the throat and initial slopes of the waveguide on a major and a minor axis of the waveguide.

37. The method of claim 32, where the waveguide is a port tube.

38. A method for creating a waveguide for use in connection with a loudspeaker, the method comprising:

developing an initial waveguide profile with two or more different exponential slopes concatenated together by using initial design values for the waveguide;

modifying the concatenated slopes of the waveguide using the change in acoustic resistance between the sections of the waveguide;

smoothing the modified slopes based upon a polynomial order curve fit; and creating a waveguide in accordance with the smoothed modified slopes.

39. The method of claim 38, where the waveguide is a transducer diaphragm.

40. The method of claim 38, where the waveguide is divided into five sections.

41. The method of claim 38, where the waveguide is divided into ten sections.

42. The method of claim 38, where the initial design values are size of the throat and initial slopes of the waveguide on a major and a minor axis of the waveguide.

43. The method of claim 38, where the waveguide is a port tube.

44. A method for creating a waveguide, the method comprising:

executing instructions obtained from a signal-bearing medium having software for designing a waveguide, the signal-bearing medium comprising:

logic configured for establishing a design metric based upon acoustic impedance;

logic configured for dividing the waveguide into two or more sections;

logic configured for setting initial design values; and logic configured for modifying the values for each section in accordance with the design metric; and creating a waveguide in accordance with the modified values.

45. The method for creating a waveguide of claim 44, the signal-bearing medium further comprising logic configured for concatenating the sections together.

46. The method for creating a waveguide of claim 45, the signal-bearing medium further comprising logic configured for smoothing the sections that are concatenated together.

47. The method for creating a waveguide of claim 44, where the design metric is the change in acoustic reactance between the sections of the waveguide.

48. The method for creating a waveguide of claim 44, where the design metric is the change in acoustic resistance between the sections of the waveguide.

49. The method for creating a waveguide of claim 44, where the design metric is the minimum change in acoustic resistance between the sections of the waveguide.

50. The method for creating a waveguide of claim 44, where the waveguide is a transducer diaphragm.

51. The method for creating a waveguide of claim 50, where the design metric is the change in acoustic impedance measured between the sections of transducer diaphragm.

52. The method for creating a waveguide of claim 44, where the waveguide is divided into five sections.

53. The method for creating a waveguide of claim 44, where the waveguide is divided into ten sections.

54. The method for creating a waveguide of claim 44, where the waveguide has a throat and a mouth and where the initial design values are dimensions of the throat and the initial slopes of the waveguide on the major and minor axis of the waveguide.

55. The method for creating a waveguide of claim 51, where initial slopes of the waveguide along major and minor axis are modified in accordance with the design metrics.

56. The method for creating a waveguide of claim 52, where slopes of each section of the waveguide are modified in accordance with the design metric.

57. The method for creating a waveguide of claim 44, where the waveguide is a port tube.

58. The method for creating a waveguide of claim 44, where the waveguide is designed for use in connection with a loudspeaker.

59. The method for creating a waveguide of claim 44, where the waveguide is designed for use in a radar application.

60. The method for creating a waveguide of claim 44, where the waveguide is designed for use in a communications application.

61. A method for creating a waveguide, the method comprising:

executing instructions obtained from a signal-bearing medium having software for designing a waveguide, the signal-bearing medium comprising:

logic configured for developing an initial waveguide profile with two or more different exponential slopes concatenated together;

logic configured for modifying the slopes based upon a design metric based upon acoustic impedance; and logic configured for smoothing the modified slopes based upon a polynomial order curve fit; and creating a waveguide in accordance with the smoothed modified slopes.

62. The method for creating a waveguide of claim 61, where the design metric is the change in acoustic reactance between the sections of the waveguide.

63. The method for creating a waveguide of claim 61, where the design metric is the change in acoustic resistance between the sections of the waveguide.

64. The method for creating a waveguide of claim 61, where the design metric is the minimum change in acoustic resistance between the sections of the waveguide.

65. The method for creating a waveguide of claim 61, where the waveguide is a transducer diaphragm.

66. The method for creating a waveguide of claim 61, where the design metric is the change in acoustic impedance measured between the sections of transducer diaphragm.

67. The method for creating a waveguide of claim 61, where the waveguide is divided into five sections.

68. The method for creating a waveguide of claim 61, where the waveguide is divided into ten sections.

69. The method for creating a waveguide of claim 61, where the waveguide has a throat and a mouth and where the initial waveguide profiles with two or more different exponential slopes concatenated together are designed by using initial design values.

70. The method for creating a waveguide of claim 69, where the initial design values are size of the throat and initial slopes of the waveguide on a major and a minor axis of the waveguide.

71. The method for creating a waveguide of claim 61, where the waveguide is a port tube.

72. The method for creating a waveguide of claim 61, where the waveguide is designed for use in connection with a loudspeaker.

* * * * *

UNITED STATES PATENT AND TRADEMARK OFFICE

CERTIFICATE OF CORRECTION

PATENT NO. : 7,197,443 B2
APPLICATION NO. : 10/697662
DATED : March 27, 2007
INVENTOR(S) : Pedro Manrique It is certified that error appears in the above-identified patent and that said Letters Patent is hereby corrected as shown below:

In the Background of the Invention:

Column 1, line 50, “to” should be removed.

Column 2, line 29, “a” should be removed.

In the Summary:

Column 2, line 67, “design” should be --designed--.

Column 3, line 47, “transducers” should be --transducer--.

In the Detailed Description:

Column 5, line 1, after “Fig. 1”, the “,” should be removed; and line 5, after “Fig. 1”, the “,” should be removed.

Column 5, line 59, “know” should be --known--.

Column 6, line 62, “variable” should be --variables--.

Column 7, line 8, “section” should be --sections--; line 18, “section” should be --sections--.

Column 8, line 47, “them” should be --then--.

Column 10, line 9, “section” should be --sections--.

Column 12, line 16, “and” should be --as--.

Column 13, line 10, after “profile”, there should be a --.--.

Column 14, line 25, “minimizes” should be --minimize--; and line 28, “of” should be --to--.

In the Detailed Description (continued):

Column 15, line 58, "design" should be --designed--; line 66, the second occurrence of "change in acoustic resistance" should be removed; and line 67, the second occurrence of "minimum change in acoustic resistance" should be removed.

Column 16, line 26, "Matlab" should be --Matlab®--.

In the Claims:

Column 18, Claim 27, line 46, --a-- should be inserted after "are".

Column 19, Claim 36, line 8, --a-- should be inserted after "are".

Column 19, Claim 42, line 32, --a-- should be inserted after "are".

Signed and Sealed this

Twentieth Day of April, 2010

David J. Kappos
*Director of the United States Patent and Trademark Office*